(12) United States Patent
Ashley et al.

(10) Patent No.: US 12,023,707 B2
(45) Date of Patent: Jul. 2, 2024

(54) METHODS OF TEMPORARILY ENHANCING THE LUSTER AND BRILLIANCE OF JEWELRY AND GEM STONES

(71) Applicants: Paul Ashley, Brazoria, TX (US); Brooke Ashley, Brazoria, TX (US)

(72) Inventors: Paul Ashley, Brazoria, TX (US); Brooke Ashley, Brazoria, TX (US)

(*) Notice: Subject to any disclaimer, the term of this patent is extended or adjusted under 35 U.S.C. 154(b) by 0 days.

(21) Appl. No.: 18/134,784

(22) Filed: Apr. 14, 2023

(65) Prior Publication Data

US 2023/0323157 A1 Oct. 12, 2023

Related U.S. Application Data

(62) Division of application No. 16/920,479, filed on Jul. 3, 2020, now abandoned.

(Continued)

(51) Int. Cl.

| | | |
|---|---|---|
| *B05D 1/02* | (2006.01) | |
| *A44C 5/00* | (2006.01) | |
| *A44C 7/00* | (2006.01) | |
| *A44C 9/00* | (2006.01) | |
| *A44C 11/00* | (2006.01) | |
| *A44C 13/00* | (2006.01) | |
| *A44C 17/00* | (2006.01) | |
| *A44C 27/00* | (2006.01) | |
| *B05D 1/00* | (2006.01) | |
| *B05D 1/18* | (2006.01) | |

(Continued)

(52) U.S. Cl.
CPC ............. *B05D 1/02* (2013.01); *A44C 5/00* (2013.01); *A44C 7/00* (2013.01); *A44C 9/00* (2013.01); *A44C 11/00* (2013.01); *A44C 13/00* (2013.01); *A44C 17/00* (2013.01); *A44C 27/00* (2013.01); *A44C 27/001* (2013.01); *A44C 27/005* (2013.01); *B05D 1/00* (2013.01); *B05D 1/18* (2013.01); *B05D 5/00* (2013.01); *C09D 5/00* (2013.01); *C09D 7/43* (2018.01); *C09D 191/00* (2013.01); *C09G 1/00* (2013.01); *C09G 1/06* (2013.01); *C09G 1/08* (2013.01); *C09G 1/14* (2013.01); *C09G 1/18* (2013.01); *C09K 15/04* (2013.01); *C09K 15/34* (2013.01); *C09K 2200/0441* (2013.01); *C09K 2200/0447* (2013.01)

(58) Field of Classification Search
None
See application file for complete search history.

(56) References Cited

U.S. PATENT DOCUMENTS

2004/0014784 A1   1/2004   Jakobi et al.
2010/0069601 A1   3/2010   Baumer
(Continued)

OTHER PUBLICATIONS

J. Whalley, "Faded glory: gemstone simulants and enhancement", the International Institute for Conservation of Historic and Artistic Works, 2012, pp. S313-S321. (Year: 2012).*

(Continued)

*Primary Examiner* — Jiong-Ping Lu
(74) *Attorney, Agent, or Firm* — Robert W. Strozier

(57) ABSTRACT

Methods of temporarily enhancing the luster and/or brilliance of a piece of jewelry, a gem stone, or a piece of jewelry including a gem stone including applying a non-aqueous composition to the piece of jewelry, the gem stone, or the piece of jewelry including a gem stone.

20 Claims, 13 Drawing Sheets

Related U.S. Application Data

(60) Provisional application No. 62/874,325, filed on Jul. 15, 2019.

(51) Int. Cl.

| | | |
|---|---|---|
| *B05D 5/00* | (2006.01) | |
| *C09D 5/00* | (2006.01) | |
| *C09D 7/43* | (2018.01) | |
| *C09D 191/00* | (2006.01) | |
| *C09G 1/00* | (2006.01) | |
| *C09G 1/06* | (2006.01) | |
| *C09G 1/08* | (2006.01) | |
| *C09G 1/14* | (2006.01) | |
| *C09G 1/18* | (2006.01) | |
| *C09K 15/04* | (2006.01) | |
| *C09K 15/34* | (2006.01) | |

(56) References Cited

U.S. PATENT DOCUMENTS

| | | | |
|---|---|---|---|
| 2010/0159256 A1* | 6/2010 | Yamasaki | C09D 5/1637 524/588 |
| 2010/0297047 A1 | 11/2010 | Santus et al. | |
| 2017/0002158 A1 | 1/2017 | Hentze et al. | |
| 2018/0251705 A1 | 9/2018 | Holscher et al. | |

OTHER PUBLICATIONS

S. Krist, Vegetable Fats and Oils, Springer Nature Switzerland, AG 2020, pp. 211-215. (Year: 2020).*

C. Johnson, "Best Natural Ways to Clean Jewelry", https://www.happy-mothering.com/how-to-clean-jewelry-naturally/, Jan. 23, 2017. (Year: 2017).*

* cited by examiner

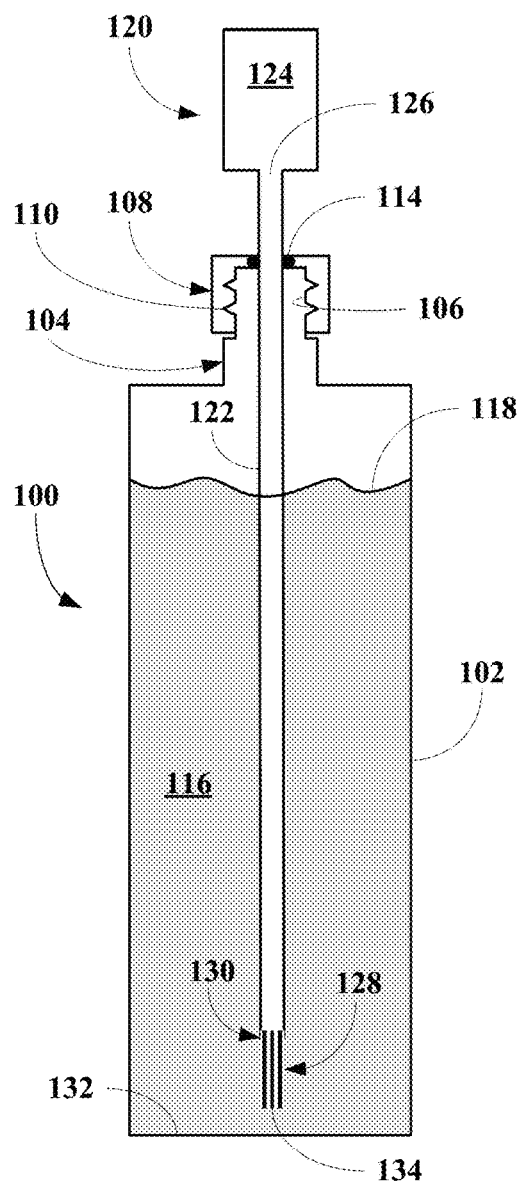
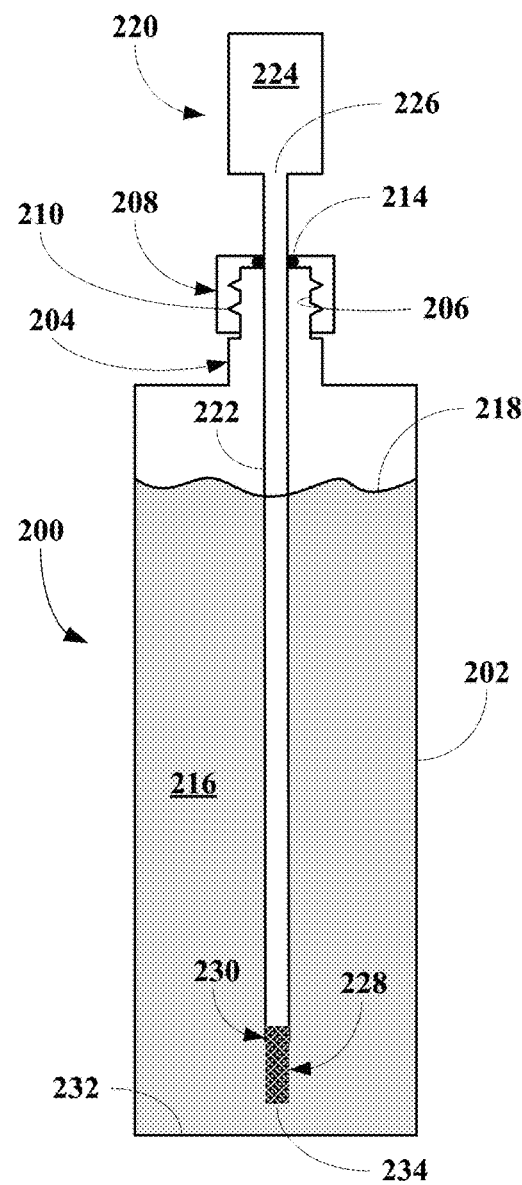
FIG. 1A
FIG. 2A
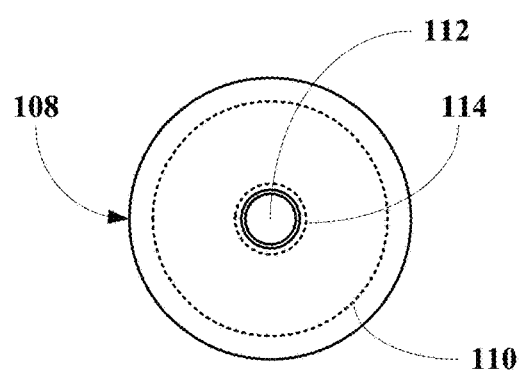
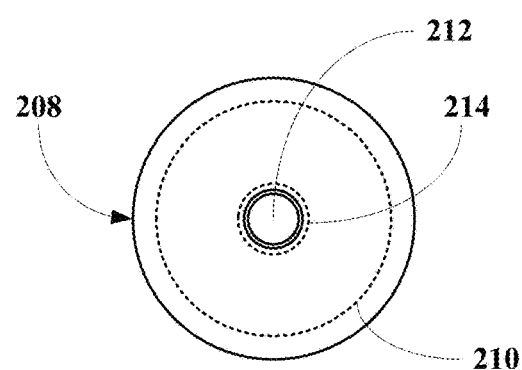
FIG. 1B
FIG. 2B

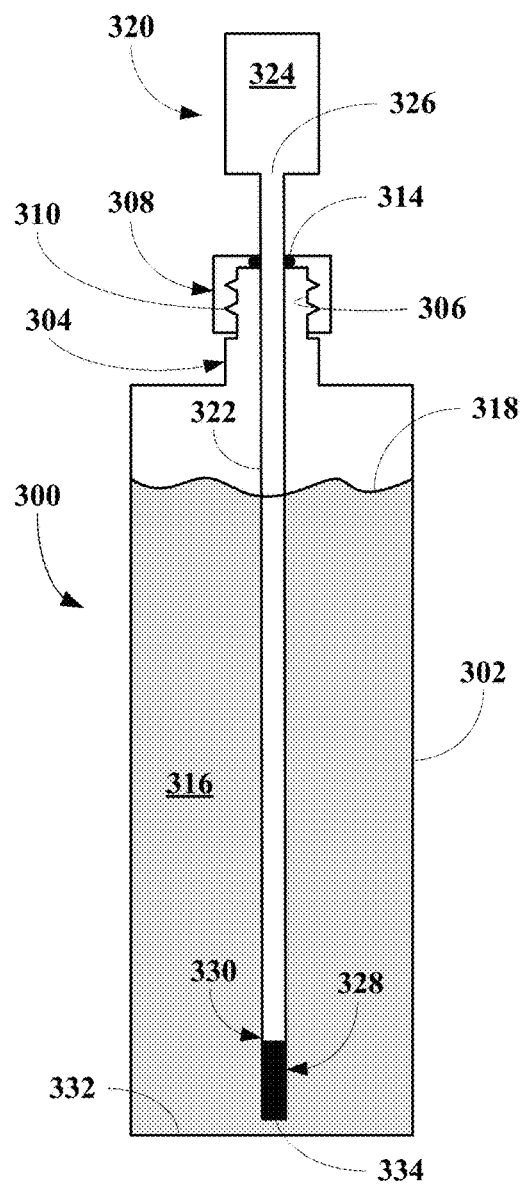
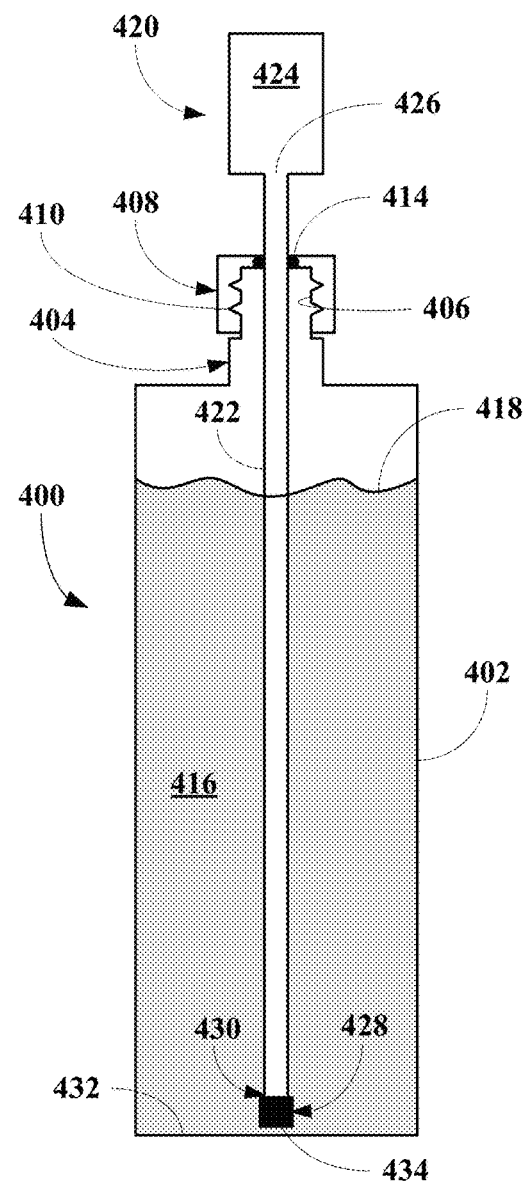
FIG. 3A
FIG. 4A
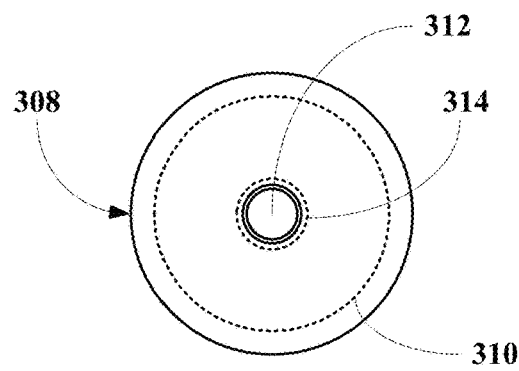
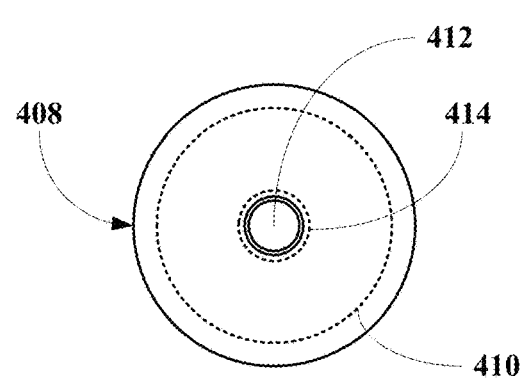
FIG. 3B
FIG. 4B

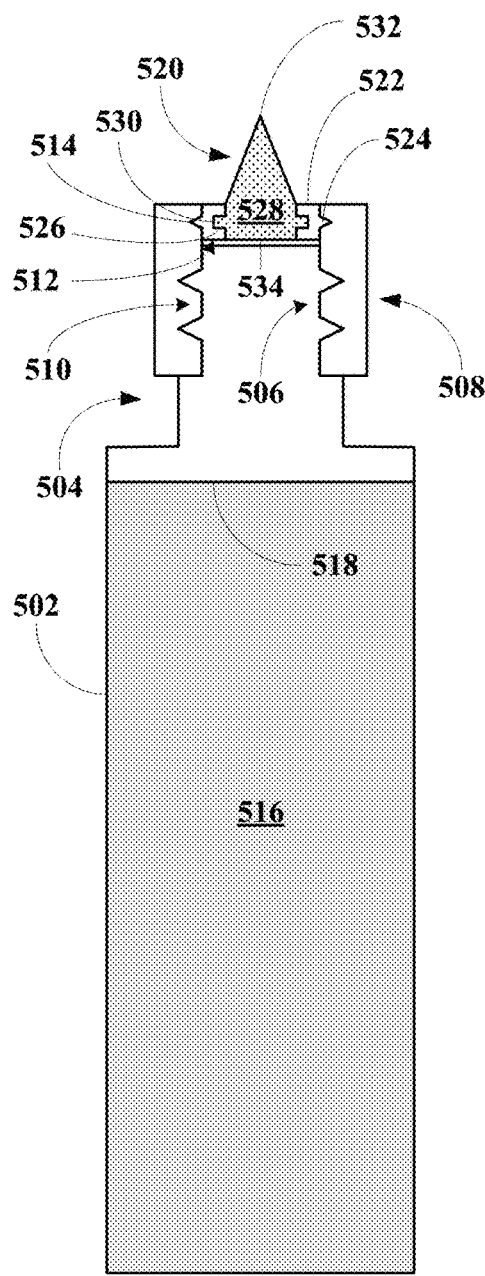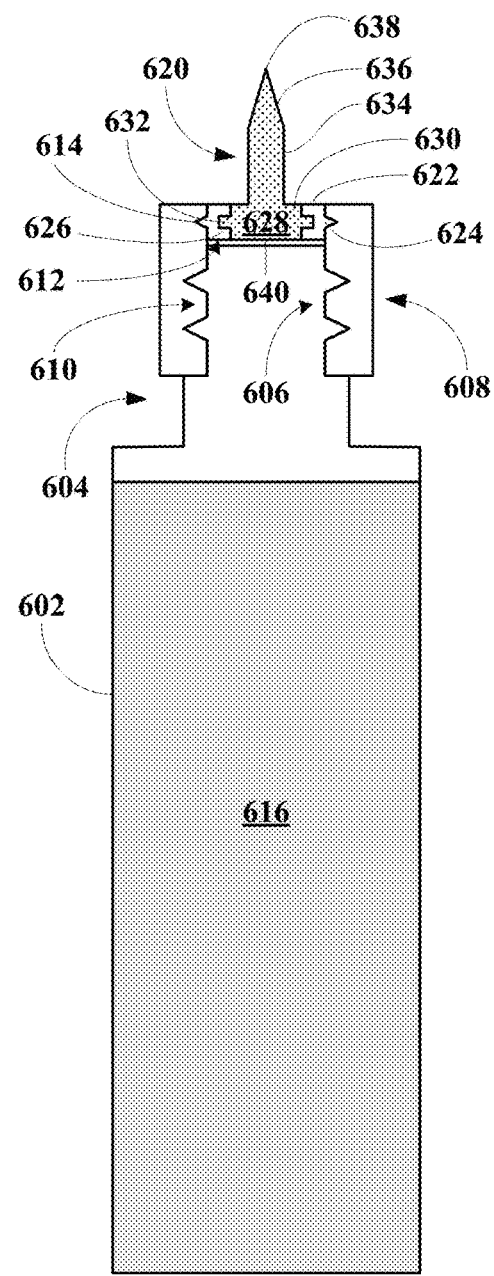
FIG. 5A                FIG. 6A
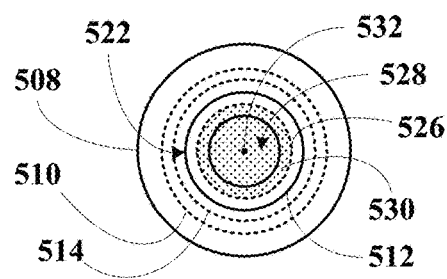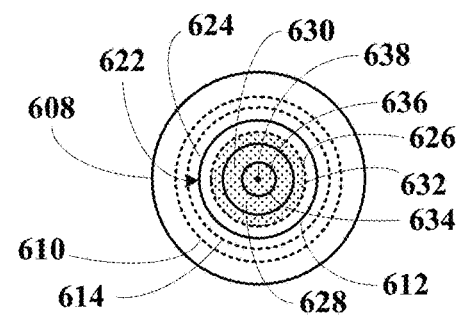
FIG. 5B                FIG. 6B

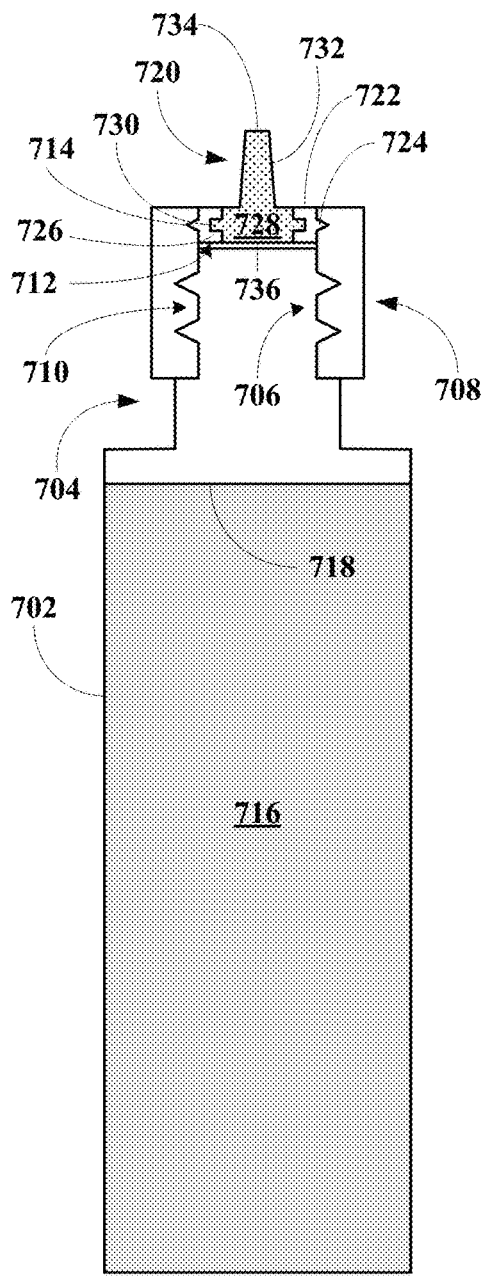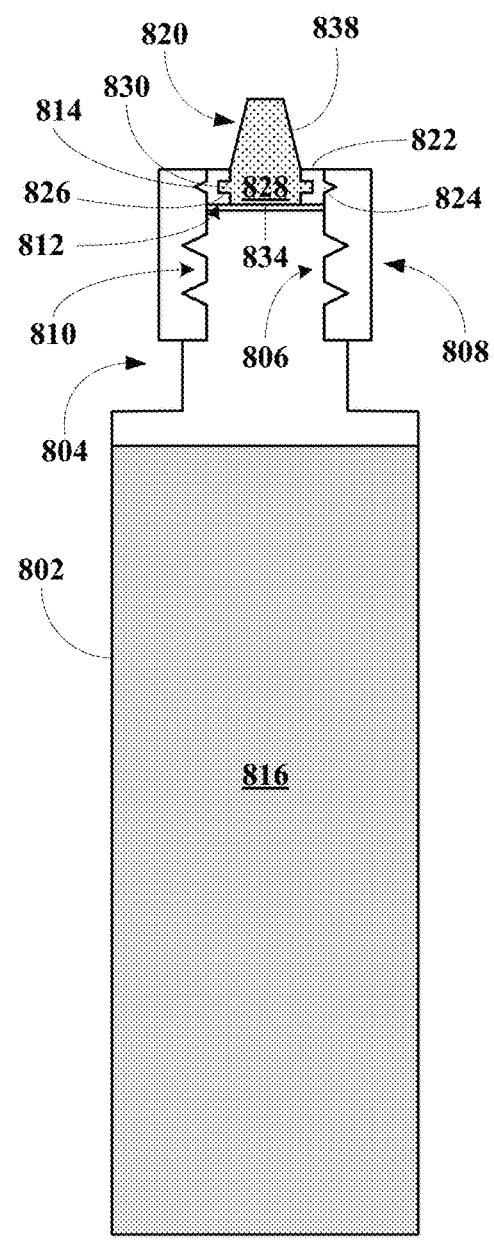
FIG. 7A     FIG. 8A
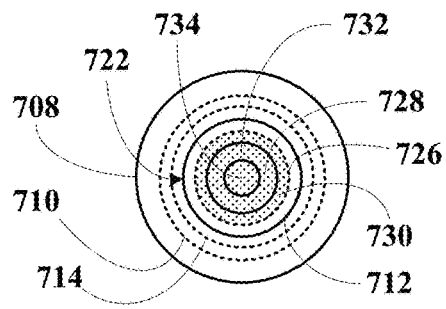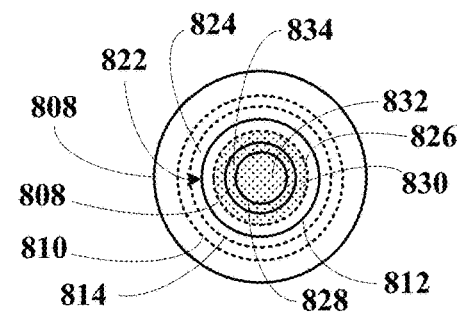
FIG. 7B     FIG. 8B

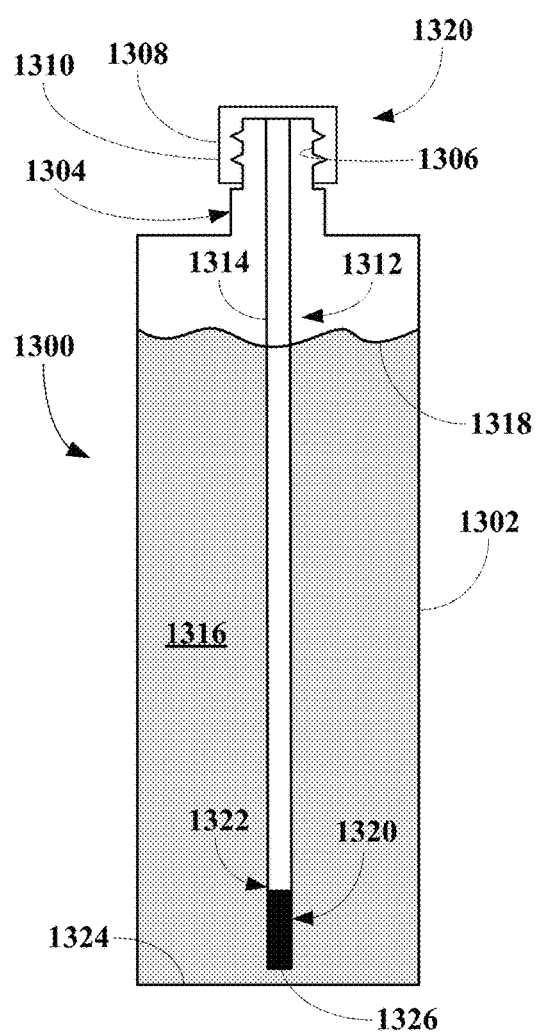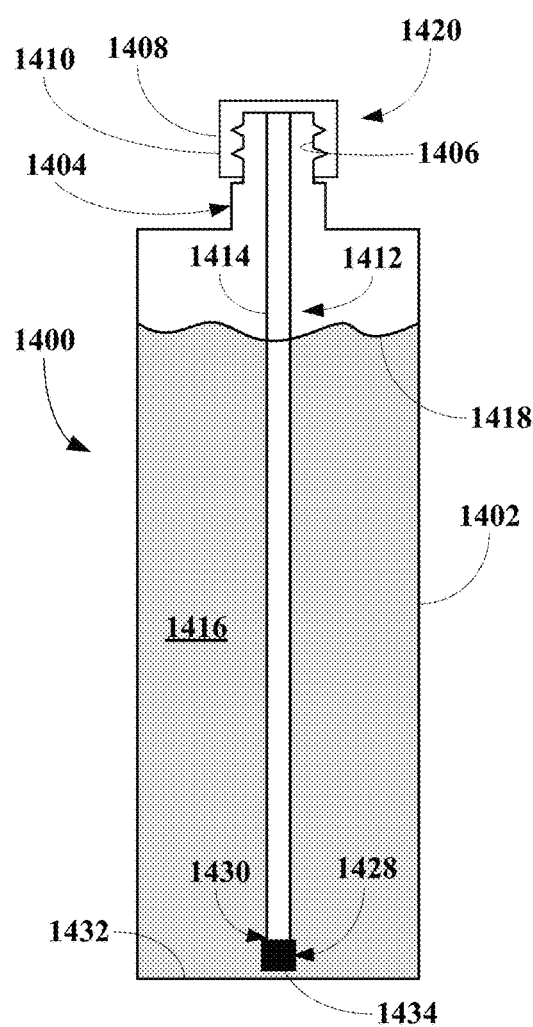
FIG. 13
FIG. 14

METHODS OF TEMPORARILY ENHANCING THE LUSTER AND BRILLIANCE OF JEWELRY AND GEM STONES

RELATED APPLICATIONS

This application is a divisional application of U.S. patent application Ser. No. 16/920,479 filed Jul. 3, 2020 (3 Jul. 2020), which claims the benefit of and priority to U.S. Provisional Patent Application Ser. No. 62/874,325 filed Jul. 15, 2019 (15 Jul. 2019).

BACKGROUND OF THE DISCLOSURE

1. Field of the Disclosure

Embodiments of the present disclosure relate to compositions for temporarily enhancing a luster and/or brilliance of jewelry and/or gem stones and methods for making and using same.

In particular, embodiments of the present disclosure relate to compositions for temporarily enhancing the luster and/or brilliance of jewelry and/or gem stones, wherein the composition comprises a brightening system, apparatuses for applying the compositions, and methods for making and using same. In certain embodiments, the brightening system includes a fragrance.

2. Description of the Related Art

Most luster enhancements for jewelry and gem stones involve some type of permanent or semi-permanent treatment. Thus, there is a need in the art for a temporary luster or brilliance enhancing composition that improves the luster and brilliance of jewelry and gem stones, but is easily removed by simple cleaning and may be applied at anytime and as often as need to improve the luster and brilliance of jewelry and gem stones.

SUMMARY OF THE DISCLOSURE

Embodiments of this disclosure provide compositions including 100 vol. % of a non-aqueous carrier selected from the group consisting of one or more one or more fatty acids, one or more glycerides, one or more essential oils, one or more hydrocarbons, one or more petroleum oils, and mixtures thereof. In certain embodiments, the compositions may also include 0.1 wt. % to about 5 wt. % of a solid fragrance based on 100 vol. % of the carrier. In other embodiments, the compositions 0.01 wt. % to about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.

Embodiments of this disclosure provide methods for enhancing luster and/or brilliance of jewelry and/or gem stones comprising applying a composition including 100 vol. % of a non-aqueous carrier selected from the group consisting of one or more one or more fatty acids, one or more glycerides, one or more essential oils, one or more hydrocarbons, one or more petroleum oils, and mixtures thereof. In certain embodiments, the compositions may also include 0.1 wt. % to about 5 wt. % of a solid fragrance based on 100 vol. % of the carrier. In other embodiments, the compositions 0.01 wt. % to about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.

Embodiments of this disclosure provide methods for making the compositions including mixing the components together at a temperature, at a pressure, and for a time sufficient to form a homogeneous or substantially homogeneous composition. The temperatures is between about room temperature and about 100° C.; the pressure is between about 0.5 atmospheres and about 5 atmospheres; and the time is between about 1 minute hours and about 4 hours. In certain embodiments, the temperatures is between about room temperature and about 70° C.; the pressure is between about 0.5 atmospheres and about 2 atmospheres; and the time is between about 1 minute and about 1 hour. In other embodiments, the temperatures is between about room temperature and about 40° C.; the pressure is between about 0.75 atmospheres and about 1.5 atmospheres; and the time is between about 1 minute and about 30 minutes. While the inventors have discloses specific ranges, the inventors intend these ranges to be end inclusive ranges and includes all subranges between the inclusive end points.

BRIEF DESCRIPTION OF THE DRAWINGS OF THE DISCLOSURE

The disclosure may be better understood with reference to the following detailed description together with the appended illustrative drawings in which like elements are numbered the same:

FIGS. 1A&B depict a cross-sectional view of an embodiment of an apparatus of this disclosure including a container including an applicator having a brush tip at its distal end and a cap having an aperture for receiving the applicator and a top plan view of the cap.

FIGS. 2A&B depict a cross-sectional view of another embodiment of an apparatus of this disclosure including a container including an applicator having a sponge tip at its distal end and a cap having an aperture for receiving the applicator and a top plan view of the cap.

FIGS. 3A&B depict a cross-sectional view of another third embodiment of an apparatus of this disclosure including a container including an applicator having a long pad at its distal end and a cap having an aperture for receiving the applicator and a top plan view of the cap.

FIGS. 4A&B depict a cross-sectional view of another embodiment of an apparatus of this disclosure including a container including an applicator having a square pad at its distal end and a cap having an aperture for receiving the applicator and a top plan view of the cap.

FIGS. 5A&B depict a cross-sectional view of another embodiment of an apparatus of this disclosure including a container including an applicator having a square pad at its distal end and a cap having an aperture for receiving the applicator and a top plan view of the cap.

FIGS. 6A&B depict a cross-sectional view of another embodiment of an apparatus of this disclosure including a container including an applicator having a square pad at its distal end and a cap having an aperture for receiving the applicator and a top plan view of the cap.

FIGS. 7A&B depict a cross-sectional view of another embodiment of an apparatus of this disclosure including a container including an applicator having a square pad at its distal end and a cap having an aperture for receiving the applicator and a top plan view of the cap.

FIGS. 8A&B depict a cross-sectional view of another embodiment of an apparatus of this disclosure including a container including an applicator having a square pad at its distal end and a cap having an aperture for receiving the applicator and a top plan view of the cap.

FIG. 13 depict a cross-sectional view of another embodiment of an apparatus of this disclosure including a container including a cap having applicator ending in an elongated pad.

FIG. 14 depict a cross-sectional view of another embodiment of an apparatus of this disclosure including a container including a cap having applicator ending in a square pad.

Figure 20A:
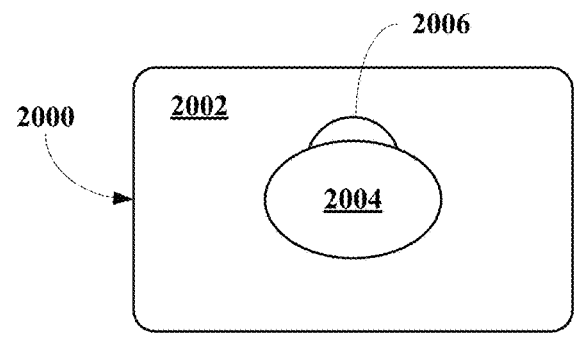

FIGS. 20A&B depict a cross-sectional view of another embodiment of an apparatus of this disclosure including a packaging including application pads.

Figures 21A, 21B:

FIGS. 21A&B depict before and after photographs of jewelry being treated with a brightening composition of this invention.

Figures 22A, 22B:

FIGS. 22A&B depict before and after photographs of jewelry being treated with another brightening composition of this invention.

Figures 23A, 23B:
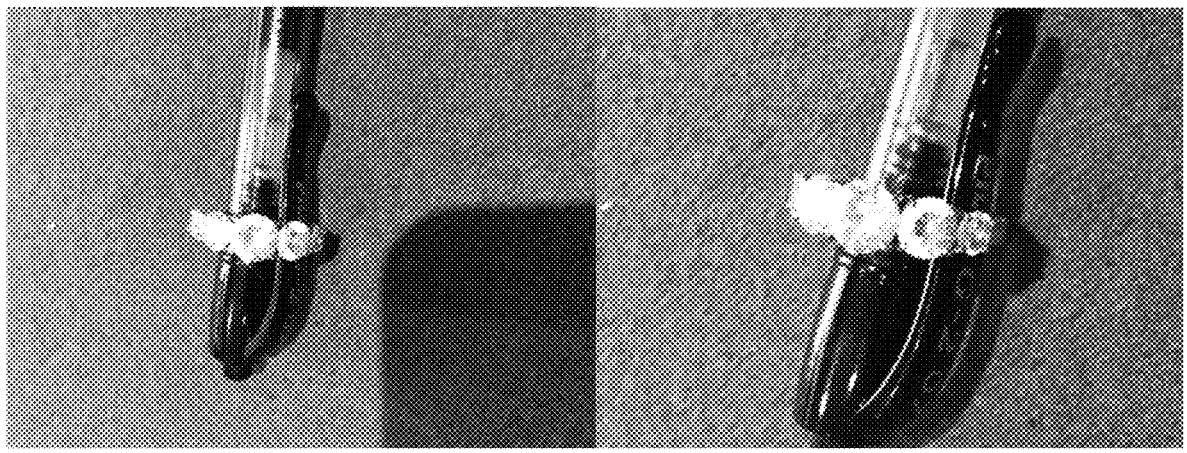

FIGS. 23A&B depict before and after photographs of jewelry being treated with another brightening composition of this invention.

Figures 24A, 24B:

FIGS. 24A&B depict before and after photographs of jewelry being treated with another brightening composition of this invention.

Figures 25A, 25B:
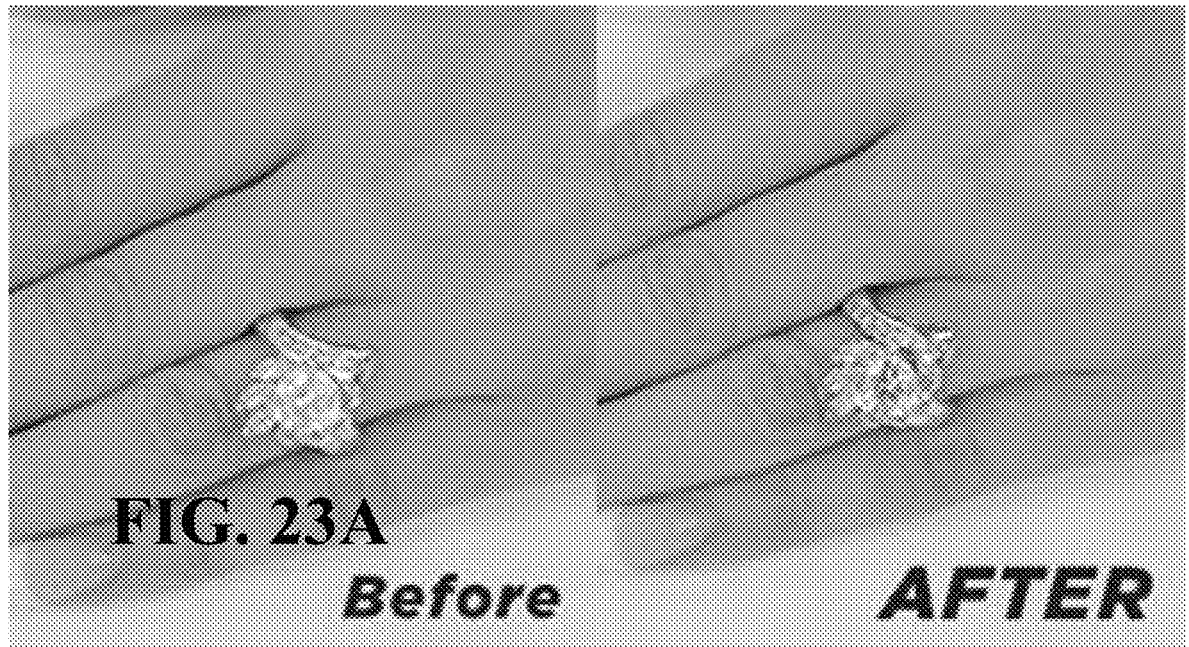

FIGS. 25A&B depict before and after photographs of jewelry being treated with another brightening composition of this invention.

Figures 26A, 26B:
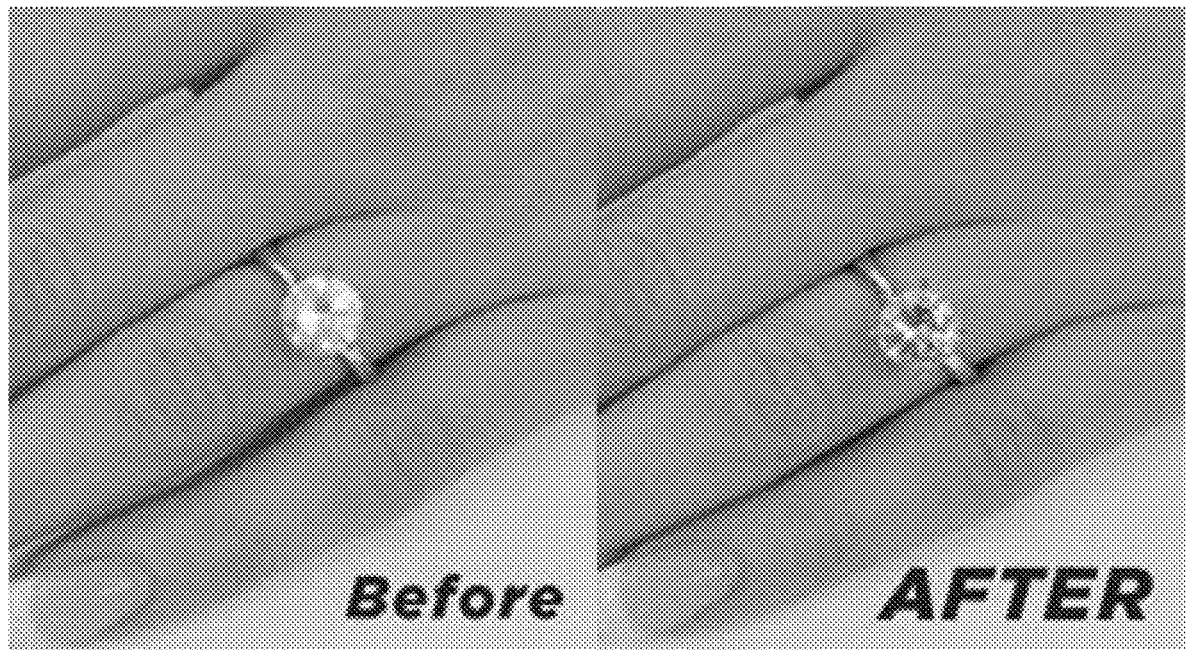

FIGS. 26A&B depict before and after photographs of jewelry being treated with another brightening composition of this invention.

Figure 27:
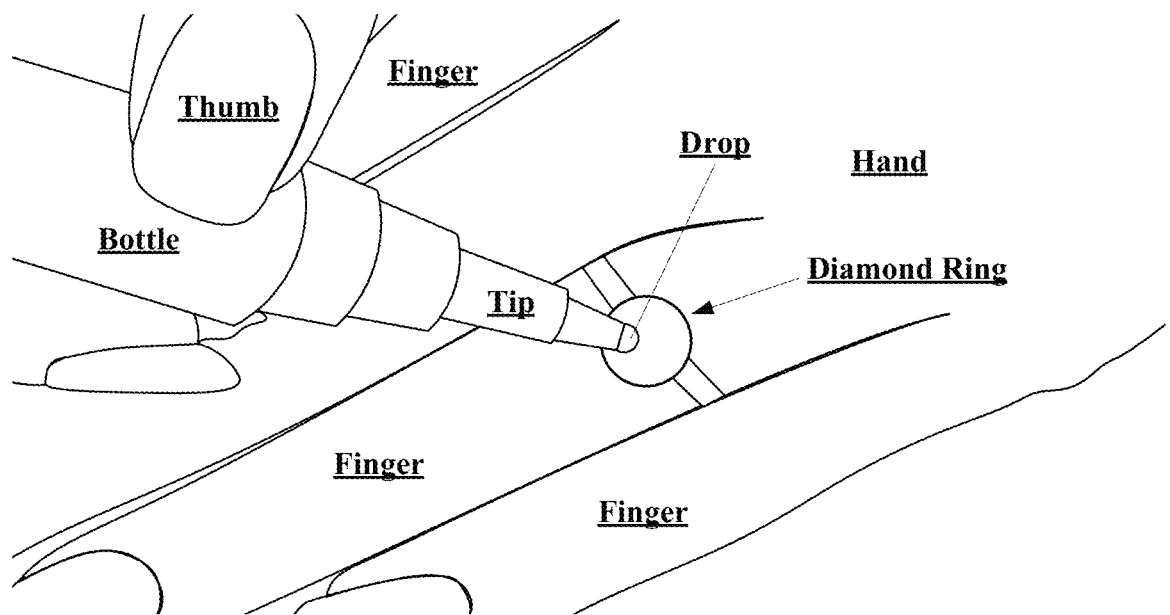

FIG. 27 depicts application of a composition of this invention onto a ring.

DEFINITIONS USED IN THE DISCLOSURE

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within ±0.1% of the stated value.

The term "Gardner Color Scale" relates to a color scale for liquids. The original definition of 1958 Gardner Color Scale was a series of 18 liquid color standards ranging from near clear, a light yellow (Gardner 1) to a dark brown (Gardner 18). Distilled water is a reference for Gardner 0.

Ranges as used herein include the main range and any sub-range. For example, at least 10% is equivalent to between 10% and 100%, on an absolute or relative basis. The term "absolute basis" means that the listed components sum to 100%, wherein the % are wt. % or vol. %. The term "relative basis" means that the listed component percentages are relative and may add up to more than 100%. The compositions may be formulated using vol. % and wt. %, wherein the wt. % would be relative to the entire volume of the compositions. For example, the range 1% to 50% including all ranges between 1 and 50. Thus, the lower limit 1 may be 1-49, and the upper limit may be 2-50, the values may be integer or real.

DETAILED DESCRIPTION OF THE DISCLOSURE

The inventors have found that compositions may be applied to jewelry and/or gem stones temporarily improving a luster and/or brilliance of the jewelry and/or gem stones. The compositions may be wiped on, brushed on, sprayed on, or the jewelry may be dipped in a composition of this disclosure. The inventors have also found that the compositions may be scented or unscented and may be clear or have a Gardner color value of less than 14. The compositions utilize ingredient that are considered safe for external use, but caution may be needed for user's with certain allergies. For example, a user that is allergic to peanuts or other nuts would not chose a composition, where the composition includes peanut oil or another nut oil. This same care would be true for users with other types of allergies.

Embodiments of this disclosure broadly relate to compositions including one or more components that temporarily enhance the luster and/or brilliance of jewelry and/or gem stones. The components include one or more fatty acids, one or more glycerides (monoglycerides, diglycerides, triglycerides, or mixtures thereof), one or more phospholipids, one or more essential oils, one or more acetates, one or more amphoteric betaines, one or more amphoteric glycinates, one or more amphoteric imidazolines, one or more amphoteric propionates, one or more other amphoteric agents, one or more hydrocarbons, one or more petroleum oils, or mixtures thereof. In other embodiments, the components also include one or more fragrances.

Embodiments of this disclosure broadly relate to apparatuses for applying a composition of this disclosure including a container including an amount of the composition, a cap, and an applicator, wherein the applicator is removable through an aperture in the cap or the cap with the applicator is removed from the container so that the composition may be applied to a piece of jewelry and/or gem stone. In other embodiments, the apparatuses include a container including an amount of the composition, a cap including an applicator, wherein the composition flows through the applicator onto the jewelry and/or the gem stone. In other embodiments, the apparatuses include a containing including an amount of the composition and spray applicator, wherein the spray application directs stream or mist (a narrow stream or fine mist) of the composition at the jewelry and/or the gem stone. In other embodiments, the apparatuses of this disclosure include a pressurized container including a spray applicator and optionally a tube to better direct a stream or mist at the jewelry and/or the gem stone.

Embodiments of this disclosure broadly relate to methods for applying a composition of this disclosure to jewelry and/or gem stones including applying the composition to a piece of jewelry and/or a gem stone using the applicator or spray applicator of this disclosure to temporarily improve the luster and/or brilliance of the jewelry and/or gem stone.

In certain embodiments, the compositions of this disclosure include one or more essential oils. In certain embodiments, the compositions also include one or more fragrances.

In other embodiments, the compositions of this disclosure include one or more glycerides. In certain embodiments, the compositions also include one or more fragrances.

In other embodiments, the compositions of this disclosure include one or more glycerides, one or more essential oils, or mixtures thereof. In certain embodiments, the compositions may also include one or more fragrances.

In other embodiments, the compositions of this disclosure include one or more fatty acids. In certain embodiments, the compositions may also include one or more fragrances.

In other embodiments, the compositions of this disclosure include one or more fatty acids, one or more glycerides, or mixtures thereof. In certain embodiments, the compositions may also include one or more fragrances.

In other embodiments, the compositions of this disclosure include one or more fatty acids, one or more glycerides, one or more essential oils, or mixtures thereof. In certain embodiments, the compositions may also include one or more fragrances.

In other embodiments, the compositions of this disclosure include one or more hydrocarbons. In certain embodiments, the compositions may also include one or more fragrances.

In other embodiments, the compositions of this disclosure include one or more petroleum oils. In certain embodiments, the compositions may also include one or more fragrances.

In other embodiments, any of the above compositions may further include one or more phospholipids, one or more amphoteric acetates, one or more amphoteric betaines, one or more amphoteric glycinates, one or more amphoteric imidazolines, one or more amphoteric propionates, one or more other amphoteric agents, or mixtures thereof. In certain embodiments, the compositions also include one or more fragrances.

Compositional Ranges

Embodiments of the compositions of this disclosure include:
100 vol. % of a non-aqueous carrier selected from the group consisting of one or more one or more fatty acids, one or more glycerides, one or more essential oils, one or more hydrocarbons, one or more petroleum oils, and mixtures thereof. The composition may also include between about 0.1 wt. % and about 5 wt. % of one or more solid fragrances based on 100 vol. % of the carrier or include between about 0.1 vol. % and about 5 vol. % or one or more liquid fragrances based on 100 vol. % of the carrier.

In certain embodiments, the compositions may also:
between about 0.01 wt. % and about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.

Embodiments of the compositions of this disclosure include:
100 vol. % of one or more fatty acids, and
0 wt. % to about 5 wt. % of a solid fragrance based on 100 vol. % of the carrier.

In certain embodiments, the compositions may also:
0.01 wt. % to about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.

Embodiments of the compositions of this disclosure include:
100 vol. % of one or more glycerides, and
0 wt. % to about 5 wt. % of a solid fragrance based on 100 vol. % of the carrier.

In certain embodiments, the compositions may also:
0.01 wt. % to about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.

Embodiments of the compositions of this disclosure include:
100 vol. % of one or more essential oils, and
0 wt. % to about 5 wt. % of a solid fragrance based on 100 vol. % of the carrier.

In certain embodiments, the compositions may also:
0.01 wt. % to about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.

Embodiments of the compositions of this disclosure include:
100 vol. % of one or more hydrocarbons, and
0 wt. % to about 5 wt. % of a solid fragrance based on 100 vol. % of the carrier.

In certain embodiments, the compositions may also:
0.01 wt. % to about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.

Embodiments of the compositions of this disclosure include:
  100 vol. % of one or more petroleum oils, and
  0 wt. % to about 5 wt. % of a solid fragrance based on 100 vol. % of the carrier.
Embodiments of the compositions of this disclosure include:
  100 vol. % of one or more fatty acids, one or more glycerides, one or more essential oils, one or more hydrocarbons, one or more petroleum oils, or mixtures thereof, and
  0.01 wt. % to about 5 wt. % of a fragrance based on 100 vol. % of the carrier.
In certain embodiments, the compositions may also:
  0.01 wt. % to about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.
Embodiments of the compositions of this disclosure include:
  100 vol. % of one or more glycerides, one or more essential oils, or mixtures thereof, and
  0.01 wt. % to about 5 wt. % of a fragrance based on 100 vol. % of the carrier.
In certain embodiments, the compositions may also:
  0.01 wt. % to about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.
Embodiments of the compositions of this disclosure include:
  100 vol. % of one or more fatty acids, one or more essential oils, or mixtures thereof, and
  0.01 wt. % to about 5 wt. % of a fragrance based on 100 vol. % of the carrier.
In certain embodiments, the compositions may also:
  0.01 wt. % to about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.
Embodiments of the compositions of this disclosure include:
  100 vol. % of one or more essential oils, one or more hydrocarbons, one or more petroleum oils, or mixtures thereof, and
  0.01 wt. % to about 5 wt. % of a fragrance based on 100 vol. % of the carrier.
In certain embodiments, the compositions may also:
  0.01 wt. % to about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.
Embodiments of the compositions of this disclosure include:
  100 vol. % of one or more essential oils, one or more hydrocarbons, one or more petroleum oils, or mixtures thereof, and
  0.01 wt. % to about 5 wt. % of a fragrance based on 100 vol. % of the carrier.
In certain embodiments, the compositions may also:
  0.01 wt. % to about 5 wt. % of one or more phospholipids, one or more amphoteric glycinates, one or more amphoteric imidazolines, one or more amphoteric propionates, one or more other amphoteric agents, or mixtures thereof based on 100 vol. % of the carrier.

COMPOSITIONAL TABLE

| Carrier | vol. % | Additive | wt. %/vol. % | Additive | wt. %/vol. % |
|---|---|---|---|---|---|
| Fatty Acids | 0-100 | Phospholipids | 0.01-5 | Propionates | 0.01-5 |
| Glycerides | 0-100 | Acetates | 0.01-5 | Anionic Surfactants | 0.01-5 |
| Essential Oils | 0-100 | Glycols | 0.01-5 | Cationic Surfactants | 0.01-5 |
| Hydrocarbons | 0-100 | Betaines | 0.01-5 | Nonionic Surfactants | 0.01-5 |
| Petroleum Oils | 0-100 | Glycinates | 0.01-5 | Zwitterionic Surfactants | 0.01-5 |
|  |  | Imidazones | 0.01-5 | Fragrances | 0.01-5 |
| Total | 100 | Total | 10 | Total | 10 |

Suitable Components for Use in the Disclosure

Fatty Acids

Suitable fatty acids for use in this invention include, without limitation, any saturated fatty acid, unsaturated fatty acids (mono and poly), or mixtures or combinations thereof suitable for topical use for human or animals. Exemplary fatty acids include short chain free fatty acids (SCFFA), medium chain free fatty acids (MCFFA), long chain free fatty acids (LCFFA), very-long-chain free fatty acids (VLCFFA) and mixtures or combinations thereof. SCFFA include free fatty acids having a hydrocarbyl tail group having less than between 4 and less than 8 carbon atoms ($C_4$ to $C_8$). MCFFA include free fatty acids having a hydrocarbyl group having between 8 and less than 14 carbon atoms ($C_8$ to $C_{14}$). LCFFA include free fatty acids having a hydrocarbyl group having between 14 and 24 carbon atoms ($C_{14}$-$C_{24}$). VLCFFA include free fatty acids having a hydrocarbyl group having greater than 24 carbon atoms ($>C_{24}$). Exemplary unsaturated fatty acids include, without limitation, myristoleic acid [$CH_3(CH_2)_3CH=CH(CH_2)_7COOH$, cis-$\Delta^9$, C:D 14:1, n-5], palmitoleic acid [$CH_3(CH_2)_5CH=CH(CH_2)_7COOH$, cis-$\Delta^9$, C:D 16:1, n-7], sapienic acid [$CH_3(CH_2)_8CH=CH(CH_2)_4COOH$, cis-$\Delta^6$, C:D 16:1, n-10], oleic acid [$CH_3(CH_2)_7CH=CH(CH_2)_7COOH$, cis-$\Delta^9$, C:D 18:1, n-9], linoleic acid [$CH_3(CH_2)_4CH=CHCH_2CH=CH(CH_2)_7COOH$, cis,cis-$\Delta^9,\Delta^{12}$, C:D 18:2, n-6], α-Linolenic acid [$CH_3CH_2CH=CHCH_2CH=CHCH_2CH=CH(CH_2)_7COOH$, $\Delta^{15}$, C:D 18:3, n-3], arachidonic acid [$CH_3(CH_2)_4CH=CHCH_2CH=CHCH_2CH=CHCH_2CH=CH(CH_2)_3COOH$, cis,cis,cis,cis-$\Delta^5\Delta^8,\Delta^{11},\Delta^{14}$, C:D 20:4, n-6], eicosapentaenoic acid [$CH_3CH_2CH=CHCH_2CH=CHCH_2CH=CHCH_2CH=CHCH_2CH=CH(CH_2)_3COOH$], cis,cis,cis,cis,cis-$\Delta^5,\Delta^8,\Delta^{11}$, $\Delta^{14},\Delta^{17}$, 20:5, n-3], erucic acid [$CH_3(CH_2)_7CH=CH(CH_2)_{11}COOH$, cis-$\Delta^{13}$, C:D 22:1, n-9], docosahexaenoic acid [$CH_3CH_2CH=CHCH_2CH=CHCH_2CH=CHCH_2CH=CHCH_2CH=CHCH_2CH=CH(CH_2)_2COOH$, cis,cis,cis,cis,cis,cis-$\Delta^4,\Delta^7,\Delta^{10},\Delta^{13},\Delta^{16},\Delta^{19}$, C:D 22:6, n-3], or mixtures and combinations thereof.

Exemplary saturated fatty acids include, without limitation, lauric acid [$CH_3(CH_2)_{10}COOH$, C:D 12:0], myristic acid [$CH_3(CH_2)_{12}COOH$, C:D 14:0], palmitic acid [$CH_3(CH_2)_{14}COOH$, C:D 16:0], stearic acid [$CH_3(CH_2)_{16}COOH$, C:D 18:0], arachidic acid [$CH_3(CH_2)_{18}COOH$, C:D 20:0], behenic acid [$CH_3(CH_2)_{20}COOH$, C:D 22:0], lignoceric acid [H₃(CH₂)₂₂COOH, C:D 24:0], cerotic acid [CH₃(CH₂)₂₄COOH, C:D 26:0], or mixture or combinations thereof.

Exemplary saturated fatty acids include, without limitation, butyric ($C_4$), valeric ($C_5$), caproic ($C_6$), enanthic ($C_7$), caprylic ($C_8$), pelargonic ($C_9$), capric ($C_{10}$), undecylic ($C_{11}$), lauric ($C_{12}$), tridecylic ($C_{13}$), myristic ($C_{14}$), pentadecylic ($C_{15}$), palmitic ($C_{16}$), margaric ($C_{17}$), stearic ($C_{18}$), nonadecylic ($C_{19}$), arachidic ($C_{20}$), heneicosylic ($C_{21}$), behenic ($C_{22}$), tricosylic ($C_{23}$), lignoceric ($C_{24}$), pentacosylic ($C_{25}$), cerotic ($C_{26}$), heptacosylic ($C_{27}$), montanic ($C_{28}$), nonacosylic ($C_{29}$), melissic ($C_{30}$), hentriacontylic ($C_{31}$), lacceroic ($C_{32}$), psyllic ($C_{33}$), geddic ($C_{34}$), ceroplastic ($C_{35}$), hexatriacontylic ($C_{36}$) and mixtures or combinations thereof. Unsaturated fatty acids include, without limitation, n-3 unsaturated fatty acids such as α-linolenic acid, stearidonic acid, eicosapentaenoic acid, and docosahexaenoic acid, n-6 unsaturated fatty acids such as linoleic acid, γ-linolenic acid, dihomo-γ-linolenic acid, and arachidonic acid, n-9 unsaturated fatty acids oleic acid, elaidic acid, eicosenoic acid, erucic acid, nervonic acid, mead acid and mixtures or combinations thereof.

Glycerides

Suitable glycerides for use in the present disclosure include, without limitation, mono-glycerides, di-glyceride, triglycerides, or mixtures thereof. Exemplary mono-glycerides include, without limitation, mono-glycerol esters, where the ester is selected from the group of fatty acids set forth above. Exemplary examples of di-glycerides include, without limitation, di-glycerol esters, where the esters are independently selected from the group of fatty acids set forth above. Exemplary examples of tri-glycerides include, without limitation, tri-glycerol esters, where the esters are independently selected from the group of fatty acids set forth above. Exemplary examples of tri-glycerides include, without limitation, vegetable/plant oils, animal oils, or mixtures thereof.

Suitable vegetable oils for use in this disclosure include, without limitation, amaranth oil, almond oil, apricot oil, argan oil, artichoke oil, avocado oil, babassu oil, ben oil, borneo tallow nut oil, buffalo gourd oil, canola oil, carob pod oil (algaroba oil), cashew oil, coconut oil, coriander seed oil, corn oil, false flax oil, grape seed oil, hazlenut oil, hemp oil, hibiscus seed oil, kapok seed oil, lallemantia oil, macadamia oil, meadowfoam seed oil, mustard oil (pressed), okra seed oil, olive oil, palm oil, peanut oil, pecan oil, perilla seed oil, pequi oil, pine nut oil, pistachio oil, poppyseed oil, prune kernel oil, pumpkin seed oil, quinoa oil, ramtil oil, rapeseed oil, rice bran oil, safflower oil, sesame oil, soybean oil, sunflower oil, tea oil (camellia oil), thistle oil, walnut oil, wheat germ oil, any other vegetable or plant oil, or mixtures thereof.

Suitable animal fats for use in this disclosure include, without limitation, lard, duck fat, butter, other animal fats, or mixtures thereof.

Hydrocarbons

Suitable hydrocarbons for use in the present disclosure include, without limitation, alkanes having between six and 30 carbon atoms, alkenes between six and 30 carbon atoms, alkylated aromatic hydrocarbons having between 10 and 30 carbon atoms, and mixtures thereof, where one or more of the carbon atoms may be replaced by an nitrogen, an oxygen, a sulfur atom, or mixtures thereof.

Petroleum Oils

Suitable hydrocarbon or petroleum oils for use in the present disclosure include, without limitation, higher alkanes derived from distilled petroleum (e.g., mineral oil, baby oil, white mineral oil, etc.), polyalphaolefins, mineral spirits, or mixtures thereof.

Phospholipids

Suitable phospholipids for use in this disclosure include, without limitation, any phospholipid or mixtures and combinations thereof. Exemplary examples of phospholipids include, without limitation, (1) diacylglyceride phospholipids or glycerophospholipids include, without limitation, phosphatidic acid (phosphatidate) (PA), phosphatidylethanolamine (cephalin) (PE), phosphatidylcholine (lecithin) (PC), phosphatidylserine (PS), phosphoinositides such as phosphatidylinositol (PI), phosphatidylinositol phosphate (PIP), phosphatidylinositol bisphosphate (PIP2) and phosphatidylinositol triphosphate (PIP3), and (2) phosphosphingolipids such as ceramide phosphorylcholine (Sphingomyelin) (SPH), ceramide phosphorylethanolamine (Sphingomyelin) (Cer-PE), and ceramide phosphorylglycerol. Amphoteric agents include acetates, betaines, glycinates, imidazolines, propionates, other amphoteric agents or mixtures thereof. Zwitterionic agents include, without limitation, zwitterionic phospholipids, zwitterionic betaines, amphoteric/zwitterionic surfactants, quaternary salts, amino acids, other compounds capable of forming or in the form of a zwitterion, or mixtures or combinations thereof.

Suitable zwitterionic phospholipids for use in this disclosure include, without limitation, a phospholipid of general formula:

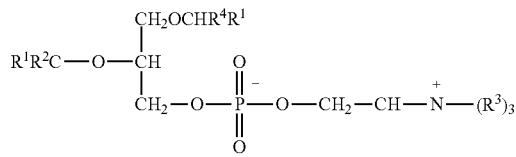

where $R^1$ and $R^2$ are saturated or unsaturated substitutions ranging from 8 to 32 carbon atoms; $R^3$ is H or $CH_3$, and X is H or COOH; and $R^4$ is =O or $H_2$. Mixtures and combinations of the zwitterionic phospholipids of the general formula and mixtures and combinations of NSAIDs can be used as well.

Exemplary examples of zwitterionic phospholipid of the above formula include, without limitation, phosphatidylcholines such as phosphatidyl choline (PC), dipalmitoylphosphatidylcholine (DPPC), other disaturated phosphatidylcholines, phosphatidylethanolamines, phosphatidylinositol, phosphatidylserines sphingomyelin or other ceramides, or various other zwitterionic phospholipids, phospholipid containing oils such as lecithin oils derived from soy beans, dimyristoylphosphatidylcholine, distearoylphosphatidylcholine, dilinoleoylphosphatidylcholine (DLL-PC), dipalmitoylphosphatidylcholine (DPPC), soy phosphatidylchloine (Soy-PC or PCs) and egg phosphatidycholine (Egg-PC or PCE). In DPPC, a saturated phospholipid, the saturated aliphatic substitution $R^1$ and $R^2$ are $CH_3$—$(CH_2)_{14}$, $R^3$ is $CH_3$ and X is H. In DLL-PC, an unsaturated phospholipid, $R^1$ and $R^2$ are $CH_3$—$(CH_2)_4$—CH=CH—$CH_2$—CH=CH—$(CH_2)_7$, $R^3$ is $CH_3$ and X is H. In Egg PC, which is a mixture of unsaturated phospholipids, $R^1$ primarily contains a saturated aliphatic substitution (e.g., palmitic or stearic acid), and $R^2$ is primarily an unsaturated aliphatic substitution (e.g., oleic or arachidonic acid). In Soy-PC, which in addition to the saturated phospholipids (palmitic acid and stearic acid) is a mixture of unsaturated phospholipids (oleic acid, linoleic acid and linolenic acid). In certain embodiments, the phospholipids are zwitterionic phospholipid include, without limitation, dipalmitoyl phosphatidylcholine, phosphatidyl choline, or a mixture thereof.

Amphoteric Acetates

Suitable amphoteric acetates for use in this disclosure include, without limitation, lauroarnphoacetate, alkyl amphoacetate, cocoampho(di)acetate, cocoarnphoacetate, cocoamphodiacetate, disodium cocoamphodiacetate, sodium cocoamphoacetate, sodium lauroamphoacetate, disodium cocoamphodiacetate, disodium capryloamphodiacetate, disodium lauroamphoacetate, disodium wheatgermamphodiacetate, cocoarnphoacetate, cocoamphoacetate, cocoamphoacetate, cocoamphoacetate and cocoamphodiacetate, disodium cocoamphodiacetate, and mixtures or combinations thereof.

Amphoteric Betaines

Suitable amphoteric betaines for use in this disclosure include, without limitation, cocamidopropyl betaine, sodium lauroamphoace, cocoamidopropyl hydroxy sulfo baden (CHSB), dodecyl dimethyl betaine, cetyl betaine, lauroamphoacetate, alkyl amphoacetate, cocoampho(di)acetate, cocoarnphoacetate, cocoamphodiacetate, disodium cocoamphodiacetate, sodium cocoamphoacetate, sodium lauroamphoacetate, disodium cocoamphodiacetate, disodium capryloamphodiacetate, disodium lauroamphoacetate, disodium wheatgermamphodiacetate, cocoarnphoacetate, alkylamido baden; alkyldimethyl betaine, cocoamidopropylbetaine, tallow bis(hydroxyethyl)baden, hexadecyldimethylbetaine, alkyl amido propyl sulfo baden, alkyl dimethyl amine baden, coco amido propyl dimethyl baden, alkyl amido propyl dimethyl amine baden, cocamidopropyl baden, lauryl betaine, laurylamidopropyl betaine, coco amido baden, lauryl amido baden, dimethicone propyl PG-betaine, N-alkyldimethyl betaine, coco biguamide derivative, cetyl baden, oleamidopropyl betaine, isostearamidopropyl betaine, oleyl betaine, wheatgermamidopropyl betaine, cocamidopropyl betaine, lauramidopropyl betaine, 2-alkyl-N-carboxymethyl-N-hydroxyethyl imidazolinium baden; cocamidopropyl betaine, isostearamidopropyl betaine, myristamidopropyl betaine, palmitamidopropyl betaine, cocamidopropyl hydroxy sultaine, ammonium chloride cocamidopropyl hydroxy sultaine and potassium chloride, cocamidopropyl hydroxy sultaine, undecylenamidopropyl baden, wheatgermamidopropyl betaine, or mixture and combinations thereof.

Amphoteric Glycinates

Suitable amphoteric glycinates for use in this disclosure include, without limitation, Ampholak 7CX, Ampholak X07, cocoamphocarboxyglycinate, tallowamphocarboxyglycinate, oleoamphocarboxyglycinate, cocoiminodiglycinate, capryloamphocarboxyglycinate, bis-2-hydroxyethyl tallow glycinate, lauryl amphoglycinate, oleic polyamphoglycinate, $C_{10/12}$-fatty acid amidoethyl-N-(2-hydroxyethyl)-glycinate, $C_{12/18}$-fatty acid amidoethyl-N-(2-hydroxyethyl)-glycinate, dihydroxyethyl tallow glycinate, and mixtures or combinations thereof.

Amphoteric Imidazolines

Suitable amphoteric imidazolines for use in this disclosure include, without limitation, 2-alkyl-1-(ethyl-beta-oxipropanoianoic)imidazoline sodium salt based on caprylic acid, 1-hydroxyethyl-2-alkylimidazoline, coco imidazoline, tall oil imidazoline, lauryl imidazoline, coco imidazoline dicarboxymethylated, sodium copra dicarboxylic imidazoline, oleyl imidazoline and mixtures or combinations thereof.

Amphoteric Propionates

Suitable amphoteric propionates for use in this disclosure include, without limitation, cocoiminodipropionate, octyliminodipropionate, cocoalkylaminopropionic acid, cocoamphodipropionate, lauraminopropionic acid, disodium tallow-p-iminodipropionate, monosodium-N-lauryl p-iminodipropionic acid, disodium lauriminodipropionate, sodium lauriminopropionic acid, 2-ethylhexylamino dipropionate, coco amino dipropionate, cocaminopropionic acid, lauraminopropionic acid, sodium lauriminodipropionate, disodium cocoamphodipropionate, disodium capryloamphodipropionate, disodium lauroamphodipropionate, sodium cocoamphopropionate, sodium lauriminodipropionate, sodium alkyliminopropionate and mixtures or combinations thereof.

Other Amphoteric Agents

Suitable other amphoteric agents for use in this disclosure include, without limitation, N-coco-3-aminobutyric acid, sodium salt, N-coco-3-aminobutyric acid, ethoxylated fatty alcohol carboxym, cocamidopropyl hydroxy sultaine, sodium cocoamphohydroxypropyl sulfonate, sodium capryloarnphohydroxypropyl sulfonate and mixtures or combinations thereof.

Anionic Surfactants

Suitable anionic surfactants include, without limitation, anionic sulfate surfactant, alkyl ether sulfonates, alkylaryl sulfonates, or mixture or combinations. Exemplary examples include sodium or ammonium alcohol ether sulfate surfactants include those having the general formula $R^1O-(CH_2CH_2O)_nSO_3NH_4$, where $R^1$ is a hydrocarbyl group including an alkyl group, an aryl group, an alkaryl group, an aralkyl group or mixture thereof. Exemplary examples include sodium or ammonium alcohol ether sulfate surfactants include short chain sodium or ammonium alcohol ether sulfate surfactants having between 2 and about 10 carbon atoms, or between about 4 and 10 carbon atoms and long chain sodium or ammonium alcohol ether sulfate surfactants having between about 10 to about 24 carbon atoms, or between about 12 and about 18 carbon atoms, or between about 12 and about 14 carbon atoms. The sodium ammonium alcohol ether sulfate surfactants are prepared by reacting 1 to 10 moles of ethylene oxide per mole of alkanol, or 3 moles of ethylene oxide per mole of alkanol.

Exemplary examples of alkylaryl sulfonates including, without limitation, alkyl benzene sulfonic acids and their salts, dialkylbenzene disulfonic acids and their salts, dialkylbenzene sulfonic acids and their salts, alkyltoluene/alkyl xylene sulfonic acids and their salts, alkylnaphthalene sulfonic acids/condensed alkyl naphthalene sulfonic acids and their salts, alkylphenol sulfonic acids/condensed alkylphenol sulfonic acids and their salts, or mixture or combinations thereof.

Exemplary examples of alkyl ether sulfonates including, without limitation, alkyl ether sulfonates having the general formula $R^2\!\!-\!\![(O-R^3O)_m-(R^4O)_n-(R^5)]_y$, where: $R^2$ is a alkyl, alkenyl, amine, alkylamine, dialkylamine, trialkylamine, aromatic, polyaromatic, cycloalkane, or cycloalkene, $R^3$ and $R^4$ are $C_2H_4$ or $C_3H_6$ or $C_4H_8$, $R^4$ is a linear or branched $C_7H_{14}SO_3X$ to $C_{30}H_{60}SO_3X$ when y is 1, $R^5$ is a linear or branched $C_7H_{14}SO_3X$ to $C_{30}H_{60}SO_3X$ or H, when y>1 but at least one $R^4$ must be linear or branched $C_7H_{14}SO_3X$ to $C_{30}H_{60}SO_3X$, m is greater or equal to 1, n is greater or equal to 0, n+m+m=1 to 30+, y is greater or equal to 1, X is alkali metal or alkaline earth metal or ammonium or amine.

Cationic Surfactants

Suitable cationic surfactants include, without limitation, Gemini, bis or di quaternary ammonium surfactants such as bis quaternary ammonium halides of bis halogenated ethane, propane, butane or higher halogenated alkanes, e.g., dichloroethane or dibromoethane, or bis halogenated ethers such as dichloroethylether (DCEE). Preferred bis quaternary ammonium halides are prepared from substituted dimethyl tertiary amines, where the substituent includes between about 4 and about 30 carbon atoms, or between about 6 and about 24 carbon atoms, and or between about 8 and about 24 carbon atoms, and where one or more of the carbon atoms can be replace by an oxygen atom in the form of an ether and/or hydroxyl moiety and/or a nitrogen atom is the form of an amido moiety. Exemplary examples of bis quaternary ammonium halides hydrocarbons are prepared from naturally occurring acids, such as fatty acids, synthetic acids, modified naturally occurring acids, or mixture or combinations thereof. Exemplary examples of naturally occurring acids are those found in naturally occurring oils such as coconut oil, palm oil, palm kernel oil, soya, safflower oil, sunflower oil, peanut oil, canola oil, or from animal such as tallow oil and its derivatives. Exemplary examples of bis quaternary ammonium halides are prepared from disubstituted methyltertiaryamines, where the substituents include between about 4 and about 30 carbon atoms, or between about 6 and about 24 carbon atoms, or between about 8 and about 24 carbon atoms, and where one or more of the carbon atoms can be replace by an oxygen atom in the form of an ether and/or hydroxyl moiety and/or a nitrogen atom is the form of an amido moiety, such as amidopropyltertiary amines, derived from the reaction of dimethyl aminopropylamine (DMAPA) or similar terminated primary-tertiary diamines, reacted with the above mentioned oils or their corresponding fatty acids, or hydroxy acids. Other cationic surfactants are dimer acids or anhydrides including alkyl-substituted maleic anhydride, alkylsubstituted diethylmalonic acid, or alkylsubstituted higher diacids such as azelaic acid (C9), trimer acids as NTA (nitriloacetic acid), and aconitic acid and trimetellic anhydride are useful though producting a higher trimer the tertiary amine may be accomplished by reaction of a diamine with a fatty acid or oil, reacting with one amine and then converting the other primary amine to tertiary by the addition of tetrahydrofuran, ethylene oxide, propylene oxide, butylene oxide, epichlorohydrin, or the like and further where the terminal hydrogens of the primary amine can be alkylated using formaldehyde/formic acid mixtures.

Suitable zwitterionic surfactants include, without limitation: (1) any compound having the general structure $R^6$, $R^7$, $R^8N^+$—$R^9$—$CO_2^-$, where $R^6$, $R^7$, and $R^8$ are the same or different hydrocarbyl group, amido hydrocarbyl group, ether hydrocarbyl group, or mixtures thereof, and $R^9$ is an alkenyl group, alkenyloxide group or mixtures thereof, (2) any compound having the general structure $R^{10}(R^7, R^8N^+$—$R^9$—$CO_2^-)_n$, where $R^7$ and $R^8$ are the same or different hydrocarbyl group, amido hydrocarbyl group, ether hydrocarbyl group, or mixtures thereof, $R^9$ is an alkenyl group, alkenyloxide group or mixtures thereof, and $R^{10}$ is a multivalent substituent having a valency n between 2 and about 6, e.g., $CH_2$ moiety when n is 2, a CH moiety when n is 3 and a C atom when n is 4; (3) any compound having the general structure $R^{12}$—C(O)—N($R^{11}$)—$R^{13}$—$N^+(R^7, R^8)$—$R^9$—$CO_2$, where $R^7$, $R^8$, $R^{11}$, and $R^{12}$ are the same or different hydrocarbyl group, amido hydrocarbyl group, ether hydrocarbyl group, or mixtures thereof, and $R^9$ and $R^{13}$ are the same or different alkenyl group, alkenyloxide group or mixtures thereof; (4) any compound having the general structure $R^{14}$—[$R^{15}$—C(O)—N($R^{11}$)—$R^{13}$—$N^+(R^7, R^8)$—$R^9$—$CO_2^-]_m$, where $R^7$, $R^8$ and $R^{11}$ are the same or different hydrocarbyl group, amido hydrocarbyl group, ether hydrocarbyl group, or mixtures thereof, $R^9$, $R^{13}$ and $R^{15}$ are the same or different alkenyl group, alkenyloxide group or mixtures thereof and $R^{14}$ is a multivalent substituent having a valency m between 2 and about 6; other similar ammonium acid zwitterionic agent; or mixtures or combinations thereof. Exemplary examples of zwitterionic compounds are betaines such as cocamidopropyl betaine, 5-(1-piperidiniomethyl)-1H-tetrazolide, or similar zwitterionic compounds. Other zwitterionic compounds for use in this invention include, without limitation, phospholipids capable of assuming a zwitterionic state such as phosphatidylcholine, phosphatidylserine, phosphalidylethanolamine, sphingomyelin and other ceramides, as well as various other zwitterionic phospholipids. Preferred sulfo-betaines and related zwitterionic compounds include, without limitation, N-Decyl-N,N-dimethyl-3-ammonio-1-propanesulfonate; dimethylbenzyl-(3-sulfopropyl)ammonium; dimethylethyl-(3-sulfopropyl)ammonium; dimethyl-(2-hydroxyethyl)-(3-sulfopropyl)ammonium; 4-N-hexylbenzoylamido-propyl-dimethylammoniosulfobetaine; 1-methyl-N-(3-sulfopropyl)morpholinium; 4-N-octylbenzoylamido-propyl-dimethylammoniosulfobetaine; 1-(3-Sulfopropyl)pyridium; N-tetradecyl-N,N-dimethyl-3-ammonio-1-propane-sulfonate, or the like or mixtures or combination thereof.

Suitable nonionic surfactants, include, without limitation, polyalkylene oxide, amine oxides, polyglycols comprising polymers of ethylene oxide (EO), propylene oxide (PO), and/or butylene oxide (BO), polyethyleneoxide polymers such as alcohol ethoxylates and the alkylphenol ethoxylates, alkyl polyglycosides, sorbitan ester surfactants, distribution of the polyoxyethylene chain, polyoxyethylene alkylphenols, polyoxyethylene alcohols, polyoxyethylene esters of fatty acids, polyoxyethylene mercaptans, polyoxyethylene alkylamines, nonionic surfactants containing an amide group, polyol ester surfactants, or mixtures or combinations.

Fragrances

Suitable fragrances for use in this disclosure include, without limitation, acai berry, absinthe, agave lime, aldehydic, allspice, almond, almond biscotti, almond & honey, almond macaroon, aloe, amaretto, amber, amber musk, ambergris, ambrosia, amish friendship bread, amish harvest, angel food cake, anise, apple, apple berry, apple blossom, apple butter pie, apple cider, apple cinnamon, apple cinnamon streusel, apple crisp, apple crumb cake, apple dumpling, apple jack, apple n spice, apple orchard, apple pear, apple pie, apple pie, homemade, apples & berries, apples and oak, appletini, apricot, apricot & cream, apricot freesia, apricot mango, asian pear and lily, asian plum, autumn splendor, autumn time leaf, autumn time wreath, avocado, azalea, baby powder, bacon, baked bread, balsam fir, balsam pine, balsamic greens & grapefruit, bamboo, banana, banana cream pie, banana kiwi, banana nut bread, banana taffy, basil, basil sage mint, bay, bayberry, bay rum, beragamot, berries & cream, berry blossom, birds of paradise, birthday cake, biscotti, biscotti: chocolate, black currant, black fig and honey, black licorice, black raspberry, blackberry cream vanilla, blackberry jam, blackberry pie, blackberry sage, blueberry, blueberry cheesecake, blueberry cobbler, blueberry flapjacks, blueberry muffin, blueberry patch, blueberry pie, blue raspberry, bouquet, boston cream pie, boysenberry, bright blossoms, brown sugar, brown sugar dates and fig, brownie, bubble gum, butt naked, butter cookie, butter pecan pie, butter rum, buttercream, buttercream crunch, buttered popcorn, buttermint candy, butterscotch, butterscotch & vanilla, cabernet, cactus flower, cafe mocha, cake bake, calla lily, campfire marshmallow, campfire smoke, camphor, candied chestnuts, candy apple, candy cane, candy corn, cannabis flower, cantaloupe, cantaloupe melon, cappuccino, capri seaside citrus, caramel, caramel apple, caramel popcorn, cardamon cedar blossom, carnation, carribbean coconut, carrot cake, casablanca lily, cashmere bouquet, cassia, cassis, cedar, chai tea, chamomile, champagne, champagne pear, champagne & roses, chardonnay, cheesecake, cherry, cherry blossom, cherry cheesecake, cherry chocolate, cherry cobbler, cherry crumb pie, cherry pie, cherry tobacco, cherry, black, cherry, red, cherry vanilla, chestnuts & brown sugar, china rain, chocolate, chocolate chip cookies, chocolate covered strawberries, chocolate fudge, chocolate mint, chocolate mousse, chocolate raspberry, chocolate sugar cookies, chocolate syrup, christmas cheer, christmas cookie, christmas memories, christmas splendor, christmas tree, chrysanthemum, chypre, churo, cilantro, cinnamon, cinnamon buns, cinnamon cookie dough, cinnamon donut, cinnamon orange, cinnamon raisin bread, cinnamon red hot, cinnamon sugar, cinnamon stick, cinnamon toast, cinnamon toffee, citronella, citronella, citrus, citrus blast, citrus blossom, citrus cilantro, citrus lotus, citrus sage, citrus splash, clean & fresh, clean linen, elementine, clove, clover, coco mango, cocoa butter, cocoa mango, coconut, coconut almond, coconut beach, coconut cream pie, coconut lemongrass, coconut lime vervain, coconut macaron, coconut, creamy, coffee, coffee cake spice, coffee w/creme, cognac, cola, cola rose, cola, cherry, cola, chocolate, cookie dough, cookies for santa, cookies n cream, cool citrus basil, corn, cornucopia, cotton candy, country berry hotcakes, country christmas, country clothesline, country meadow, country spice, crab apple, cran-apple, cran-orange, cranberry, cranberry cobbler, cranberry currant, cranberry orange, cranberry relish, cranberry spice, creamsicle, cream sorbet, creme brulee, crisp morning air, cucumber, cucumber mint, cucumbers & melons, cupcake, cyclamen, cyprus & citron, daffodil, dahlia, daisy, dandelion, delicious apple, delphinium, desert flowers, dewberry, dirt, dogwood, douglas fir, dragon's blood, dream-sickle, driftwood, earth, egg nog, elderberry wine, english ivy, english lavender, eucalyptus, eucalyptus spearmint, evergreen, expresso, everglades, evergreen forest, fern, fireplace, fig, floral bouquet, floral potpourri, flower shop, flowering dogwood, forest pine, forsythia, frangipan, frankincense, frankincense & myrrh, freesia, french market, fresh cut grass, fresh & clean, fresh linen, fresh outdoors, fresh squeezed orange, frozen margarita, fruit bouquet, fruit cocktail, fruity floral, fuzzy navel, garden mint, gardenia, gardenia lily, bay rum, georgia peach, geranium, german chocolate cake, ginger, ginger blossom, gingerbread, gingerbread cookie, ginger fig, ginger—hawaiian, ginger—kiwi, ginger lime, ginger orange, ginger peach, ginger pumpkin, ginger snap, ginger spice, gladiola, goat milk & honey, gooseberry, gourmet dark chocolate, graham cracker, grandma's kitchen, grape, grape concord, grape soda, grapefruit, grapefruit—pink, grapefruit—ruby red, grapefruit rhubarb, green clover and aloe, green floral, green mint, green tea, green tea & cucumber, guarana, guava, guess for men, harvest, hawaiian flower, hawaiian ginger, hawaiian punch, hayride, hazelnut, hazelnut coffee, heartfelt floral, heather, heliotrope, hemlock, herbal, herbal mint, herbal mist, hibiscus, hollyberry, home sweet home, honey, honey almond, honeydew melon, honeysuckle, hot backed apple pie, hot buttered rum, hot chocolate, hot cocoa, hot fudge brownie, hot orange danish, hot toddy, huckleberry, hyacinth, hydrangea, iced cinnamon rolls, iced pineapple, iced tea twist, impatients, indian sandalwood, indian summer, iris, irish cream, island breeze, italian biscotti, jack's frosty nose, jamaica me crazy, jasmine, jasmine gardenia, jelly beans, jelly doughnut, juniper, juniper breeze, just peachy, kailua, kettle corn, key lime pie, kiwi, kiwi strawberry, kiwi watermelon, kudzu, kumquat, lavanda, lavender, lavender apple, lavender & basil, lavender fields, lavender flowers, lavender, french, lavender sage, lavender & lemongrass, lavender martini, lavender vanilla, leather, lemon, lemon cheesecake, lemon chiffon, lemon drops, lemon ice, lemon meringue pie, lemon peel, lemon poppyseed, lemon pound cake, lemon pucker, lemon squares, lemon sugar, lemon tea cake, lemon verbena mint, lemonade, lemongrass, lemongrass sage, lemon lime, lemon verbena, lick me all over, licorice, lilac, lily, lily of the valley, lime, lime cilantro, linen breeze, log cabin, loganberry, lotus blossom, lotus, macadamia nut, madagascar spice, magnolia & orange blossom, magnolia, mandarin, mandarin lime, mango, mango coconut, mango mandarin, mango & melon, mango peach, mango sorbet, mango tango twist, maple, maple fudge, maple pecan, maple sugar, maple syrup, mangosteen, maple walnut fudge, marichino cherry, margarita, maricopa, marigold, marmalade, marshmallow, mask odor, mayan gold, medicinal, melon, menthol, merlot wine, midsummer, mimosa, mint, mint chocolate chip, mint julep, mistletoe, mixed berries, mocha java, modern, mojito, money, monkey farts, morning glory, mountain air, moss, mulberry, mulberry spice, mulled cider, muscadine, musk, myrrh, nag champp, narcissus, new mown hay, neroli, neutroleum alpha, new car scent, nutmeg, nutty taffy apples, o'christmas tree, oak & apples, oakmoss, oatmeal cookies, oatmeal, milk & honey, oatmeal raisin cookie, ocean breeze, ocean mist, odor mask, odor neutralizers, olive blossom, orange, orangesicle, orange blossom, orange burst, orange & cinnamon, orange clove, orange cranberry, orange fresh, orange fruit, orange juice, orange peel, orange sherbet, orange spice, orchid, orchid blossom, orchid rain, oriental, orris root, oud, pansy, papaya, papaya mango, papaya tangerine, paper whites, paradise punch, passion flower, passion fruit, passionate smooch, passionflower & acai berry, patchouli, peach, peach blossom, peach, fresh, peaches n' cream, peach brandy, peach cobbler, peach nectar, peach preserves, peanut butter cookie, peanut butter cup, pear, pear, spiced, pearberry, pears n'berries, pecan, pecan pie, pecan & pralines, peony, peppercorn, peppermint, peppermint stick, persimmon spice, periwinkle, pie crust, pikake flowers, pina colada, pine, pine forest, pine, pinion, pineapple, pineapple cilantro, pineapple upside down cake, pink bubblegum, pink salt & water lily, pink grapefruit, pink lemonade, pistachio, pizza, plum, plum pudding, plumeria, poinsettia, pomegranate, pomegranate, midnight, pomegranate martini, pomegranate quince, popcorn, poppy, potpourri, potpourri spice, powder, primrose, pumpkin, pumpkin apple butter, pumpkin cheesecake, pumpkin crunch cake, pumpkin eggnog, pumpkin patch, pumpkin pie, pumpkin pie spice, pumpkin spice, rain, rainforest, raspberry, raspberry cream, raspberry guava, raspberry sorbets, raspberry truffle, red currant, red currant & thyme, red hot cinnamon, red raspberry, red velvet cake, redwood embers, rhubarb, rice flower & shea, ripened raspberry, roasted chestnut, root beer, root beer float, rose, rose geranium, rose jasmine, rosemary, rosemary mint, rosewood, rum ripened raisin, s'mores, sage, sage leaf, sage & citron, sage, sweetgrass & cedar, sandalwood, sandalwood vanilla, sassafras, satin sheets, satsuma, sea breeze, seasons greetings, sex on the beach, shiraz, shortbread, sinus relief, sleigh bells, sleigh ride, smoke out, snapdragon, snicker doodle, spearmint, spice, spice cake, spiced apple pecan, spiced chestnut, spiced coffee cake, spiced cranberry, spiced gum drops, spiced sugar plum, spiced tea, spring air, spring bloom, spring rain, spring shower, spruce, strawberries-n-cream, strawberry, strawberry cheesecake, strawberry daiquiri, strawberry jam, strawberry-kiwi, strawberry patch, strawberry preserves, strawberry rhubarb pie, strawberry shortcake, strawberry wine, sugar champagne, sugar cookie, sugar plum, summer blossoms, sun dried cotton, sun dried linen, suntan oil, sweetgrass, sweet orange chili pepper, sweet pea, sweet potatoe pie, syringa, taffy, tamarind nectarine, tangerine, teaberry, tea rose, teakwood, three wise men, thyme, tibetan black tea, tiger lily, toasted marshmallow, tobacco, toffee maple crunch, tomato basil, tomato leaf, tonka bean, tropical delight, tropical mango, tropical paradise, truffles, tuberose, tulip, tuscan wine, tutti fruitti, twigs & berries, vanilla almond, vanilla, vanilla bean, vanilla bean xmas, vanilla berry, vanilla blossom, vanilla, bourbon, vanilla caramel, vanilla, cherry, vanilla, cinnamon, vanilla, coconut, vanilla cream, vanilla extract, vanilla fantasy, vanilla, french, vanilla grapefruit, vanilla hazelnut, vanilla musk, vanilla, nutty, vanilla, orange, vanilla spice, vanilla sugar, vanilla velvet, vanilla wafer, verbena, verbena & lemon, vetiver, victorian christmas, vineyard grape, vintage gardenia, violet, vitiver wood, waffle cone, walnut, warm rustic woods, warm vanilla & sugar, wassail, water-blown cotton, water lily, watermelon, wedding cake, wedding day, white chocolate, white chocolate truffle, white christmas, white citrus, white gardenia, white linen, white nectarine, white tea & ginger, white tea, white truffle raspberry, wildberry, wild flower, wild honeysuckle, wild grass fields, wild mountain berry, wine cellar, wine & roses, winter garden, wintermint, wintergreen, wisteria, witches magical brew, woodberry, woodland, xmas wreath, ylang ylang, yuzu, zinfindel, zinnia, zucchini bread, or mixtures thereof.

Suitable jewelry upon which the compositions of this disclosure my be applied include, without limitation, rings, brooches, pendants, necklaces, bracelets, ear rings, watches, or any other jewelry. The jewelry may include one or more gem stones therein.

Suitable gem stones for use in this disclosure include, without limitation, Actinolite, Nephrite, Adamite, Aegerine, Afghanite, Agate, IrisAgate, Onyx, Sardonyx, Agrellite, Albite, Alunite, Amblygonite, Analcime, Anatase, Andalusite, Chiastolite, Andesine, Anglesite, Anhydrite, Annabergite, Antigorite, Bowenite, Apatite, Apophyllite, Aragonite, Arfvedsonite, Astrophyllite, Atacamite, Austinite, Ferroaxinite, Magnesioaxinite, Manganaxinite, Tinzenite, Azurite, Baryte, Bastnaesite, Bayldonite, Benitoite, Aquamarine, Bixbite, Emerald, Goshenite, Goldenberyl, Heliodor, Morganite, Beryllonite, Beudantite, Biotite, Boleite, Boracite, Bornite, Brazilianite, Bronzite, Brookite, Brucite, Bustamite, Bytownite, Calcite, Manganocalcite, Caledonite, Cancrinite, Vishnevite, Carletonite, Carnallite, Carnelian, Cassiterite, Cavansite, Celestite (celestine), Cerussite, Chabazite, Chalcopyrite, Chambersite, Charlesite, Charoite, Childrenite, Chloromelanite, Chondrodite, Chrysoberyl, Alexandrite, Cymophane, Chromite, Chrysocolla, Chrysoprase, Chrysotile, Cinnabar, Citrine, Clinochlore, Clinohumite, Clinozoisite, Clintonite, Cordierite, Iolite, Corundum, Ruby, Sapphire, Covellite, Creedite, Cryolite, Cuprite, Danburite, Datolite, Diamond, Bort, Diaspore, Diopside, Dioptase, Dolomite, Dravite, Dumortierite, Elbaite, Emerald, Trapicheemerald, Enstatite, Bronzite, Hypersthene, Eosphorite, Epidote, Piemontite, Erythrite, Esperite, Ettringite, Euclase, Eudialyte, Fayalite, Ferroaxinite, Andesine, Albite, Anorthite, Anorthoclase, Amazonite, Bytownite, Celsian, Labradorite, Microcline, Moonstone, Orthoclase, Sanidine, Sunstone, Fluorapatite, Fluorapophyllite, Fluorite, Forsterite, Gahnite, Pyralspite, Almandine, Pyrope, Spessartine, Ugrandite, Andradite, Demantoid, Melanite, Topazolite, Grossular, Hessonite, Hydrogrossular, Tsavorite, Uvarovite, Almandine-Pyrope, Rhodolite, Andradite-Grossular, Grandite, Pyrope-Almandine-Spessartine, Malaiagarnet, Pyrope-Spessartine, Umbalite, Gaspeite, Gaylussite, Gibbsite, Glaucophane, Goethite, Goosecreekite, Grandidierite, Gypsum, Gyrolite, Hackmanite, Halite, Hambergite, Hanksite, Hardystonite, Hauyne, Hematite, Hemimorphite, Herderite, Hexagonite, Hibonite, Hiddenite, Hodgkinsonite, Howlite, Humite, Hypersthene, Iolite, Jade, Jadeite, Nephrite, Jasper, Radiolarite, Jeremejevite, Kainite, Kornerupine, Kunzite, Kutnohorite, Kurnakovite, Kyanite, Langbeinite, LapisLazuli, Larimar, Lawsonite, Lazurite, Legrandite, Lepidolite, Leucite, Leucophanite, Linarite, Lizardite, Londonite, Ludlamite, Magnesite, Malachite, Marialite-Meionite, Wernerite, Mimetite, Moissanite, Moonstone, Adularia, Rainbow, Mottramite, Muscovite, Fuchsite, Musgravite, Narsarsukite, Natrolite, Nepheline, Neptunite, Nickeline, Nuummite, Opal, Painite, Papagoite, Pargasite, Pectolite, Larimar, Peridot, Periclase, Petalite (castorite), Pezzottaite, Phenakite, Phlogopite, Phosgenite, Phosphophyllite, Piemontite, Pieterite, Plumbogummite, Pollucite, Polyhalite, Poudretteite, Prasiolite, Prehnite, Prismatine, Proustite, Pumpellyite, Chlorastrolite, Purpurite, Pyrite, Pyrargyrite, Pyromorphite, Pyrrhotite, Quartz, Amethyst, Ametrine, Chalcedony, Agate, IrisAgate, Onyx, Sardonyx, Bloodstone (Heliotrope), Carnelian, ChromeChalcedony, Chrysoprase, Dendritic Agate, MossAgate, Fireagate (Iridescentvar), Jasper, PetrifiedWood, Sard, Citrine, Druzy, Flint, Milkyquartz, Prasiolite, Rosequartz, Rockcrystal, Smokyquartz, Ruby, Richterite, Rosequartz, Rhodizite, Rhodochrosite, Riebeckite, Crocidolite, Rosasite, Rutile, Sapphire, Padparadscha, Sard, Sardonyx, Scapolite, Scheelite, Schorl, Scolecite, Scorodite, Selenite, Sellaite, Senarmontite, Sérandite, Seraphinite, Serendibite, Antigorite, Bowenite, Chrysotile, Lizardite, Stichtite, Shattuckite, Shigaite, Shortite, Shungite, Siderite, Sillimanite, Sinhalite, Smithsonite, Sodalite, Hackmanite, Sperrylite, Spessartite, Spinel, Ceylonite, Spodumene, Hiddenite, Kunzite, Triphane, Stichtite, Staurolite, Sulfur, Stolzite, Sugilite, Bustamite, Richterite, Sylvite, Taaffeite, Tantalite, Thomsonite, Thaumasite, Tinaksite, Titanite (sphene), Topaz, Achroite, Canary, Fluor-liddicoatite, Indicolite, Olenite, Paraiba, Rossmanite, Rubellite, Tremolite, Hexagonite, Tugtupite, Turquoise, Vanadinite, Variscite, Vayrynenite, Vesuvianite (idocrase), Californite, Villiaumite, Vlasovite, Wavellite, Weloganite, Willemite, Wulfenite, Xonotlite, Zektzerite, Zeolites, Analcite, Apophyllite, Chabazite, Goosecreekite, Natrolite, Stellarite, Thomsonite, Zincite, Zinnwaldite, Zircon, Jacinth, Zoisite, Tanzanite, Thulite, Zulta, or mixtures thereof.

Suitable aerosol propellants for use in this disclosure include, without limitation, air, nitrogen, argon, carbon dioxide, other mixture of oxygen and nitrogen, or mixtures thereof.

Suitable solvents for use in this disclosure include, without limitation, ethanol, isopropyl alcohol, acetone, hexane, cyclohexane, dibasic esters (e.g., dibasic esters such as dimethyl succinate, diethyl succinate, dipropyl succinate, diisopropyl succinate, dibutyl succinate, dimethyl glutarate, diethyl glutarate, dipropyl glutarate, diisopropyl glutarate, dibutyl glutarate, dimethyl adipate, diethyl adipate, dipropyl adipate, diisopropyl adipate, dibutyl adipate, dimethyl phthalate, diethyl phthalate, dipropyl phthalate, diisopropyl phthalate, dibutyl phthalate, higher dibasic esters, and mixtures or combinations thereof), soy methyl esters, fatty acid methyl esters (e.g., methyl esters such as methyl esters of $C_{12}$-$C_{36}$ carboxylic acids including methyl laurate (methyl dodecanate), methyl tridecylicate (methyl tridecanate), methyl myristic (methyl tetradecanate), methyl pentadecylic (methyl pentadecanate), methyl palmitic (methyl hexadecanate), methyl margaric (methyl heptadecanate), methyl stearic (methyl octadecanate), methyl nonadecylic (methyl nonadecanate), methyl arachidic (methyl eicosanate), methyl heneicosylic (methyl heneicosanate), methyl behenic (methyl docosanate), methyl tricosylic (methyl tricosanate), methyl lignoceric (methyl tetracosanate), methyl pentacosylic (methyl pentacosanate), methyl cerotic (methyl hexacosanate), methyl heptacosylic (methyl heptacosanate), methyl montanic (methyl octacosanate), methyl nonacosylic (methyl nonacosanate), methyl melissic (methyl triacontanate), methyl henatriacontylic (methyl henatriacontanate), methyl laccerate (methyl dotriacontanate), methyl psyllic (methyl tritriacontanate), methyl geddic (methyl tetratriacontanate), methyl ceroplastic (methyl pentatriacontanate), methyl hexatriacontylate (methyl hexatriacontanate), methyl α-linolenate, methyl stearidonate, methyleicosapentaenate, methyl docosahexaenate, methyl linoleate, methyl linolenate, methyl dihomo-γ-linolenate, methyl arachidonate, methyl adrenate, methyl palmitoleate, methyl vaccenate, methyl paullinate, methyl oleiate, methyl elaidate, methyl gondate, methyl erucate, methyl nervonate, methyl meadate, other similar methyl esters, and mixtures or combinations thereof), methyl acetate, parachlorobenzotrifluoride (PCBTF), low vapor pressure solvents (e.g., normal paraffin, an isoparaffin, a cycloparaffin, or mixtures thereof, where paraffins, isoparaffins, or cycloparaffins include between 12 carbon atoms and 24 carbon atoms), or mixtures thereof.

DETAILED DESCRIPTION OF THE DRAWINGS

Referring now to FIGS. 1A&B, a cross-sectional view of an embodiment of an apparatus of this disclosure, generally 100, is shown to include a container 102 having a neck 104 having threads 106 and a cap 108 having threads 110, an aperture 112, and an O-ring 114 associated with the aperture 112, wherein the neck threads 106 and the cap threads 110 are designed to engage each other to make a liquid tight seal. The container 102 is shown here filled with a liquid composition of this disclosure 116 to a fill line 118. The apparatus 100 also includes an applicator 120 comprising an elongated cylindrical member 122 having a grip 124 at its proximal end 126 and a brush tip 128 at its distal end 130. The aperture 112 is designed to receive the applicator 120 so that when the applicator distal end 130 is inserted into and through the aperture 108, the O-ring 114 makes a liquid tight seal with the elongated cylindrical member 122 and the brush tip 128 is in the liquid 112 near a bottom 132 of the container 102, wherein near means with about 5 mm of the bottom 132. In certain embodiments, a distal end 134 of the brush tip 128 contacts the bottom 132.

Referring now to FIGS. 2A&B, a cross-sectional view of another embodiment of an apparatus of this disclosure, generally 200, is shown to include a container 202 having a neck 204 having threads 206 and a cap 208 having threads 210, an aperture 212, and an O-ring 214 associated with the aperture 212, wherein the neck threads 206 and the cap threads 210 are designed to engage each other to make a liquid tight seal. The container 202 is shown here filled with a liquid composition of this disclosure 216 to a fill line 218. The apparatus 200 also includes an applicator 220 comprising an elongated cylindrical member 222 having a grip 224 at its proximal end 226 and a sponge tip 228 at its distal end 230. The aperture 212 is designed to receive the applicator 220 so that when the applicator distal end 230 is inserted into and through the aperture 208, the O-ring 214 makes a liquid tight seal with the elongated cylindrical member 222 and the sponge tip 228 is in the liquid 212 near a bottom 232 of the container 202, wherein near means with about 5 mm of the bottom 232. In certain embodiments, a distal end 234 of the sponge tip 228 contacts the bottom 232.

Referring now to FIGS. 3A&B, a cross-sectional view of another embodiment of an apparatus of this disclosure, generally 300, is shown to include a container 302 having a neck 304 having threads 306 and a cap 308 having threads 310, an aperture 312, and an O-ring 314 associated with the aperture 312, wherein the neck threads 306 and the cap threads 310 are designed to engage each other to make a liquid tight seal. The container 302 is shown here filled with a liquid composition of this disclosure 316 to a fill line 318. The apparatus 300 also includes an applicator 320 comprising an elongated cylindrical member 322 having a grip 324 at its proximal end 326 and an elongated pad tip 328 at its distal end 330. The aperture 312 is designed to receive the applicator 320 so that when the applicator distal end 330 is inserted into and through the aperture 308, the O-ring 314 makes a liquid tight seal with the elongated cylindrical member 322 and the elongated pad tip 328 is in the liquid 312 near a bottom 332 of the container 302, wherein near means with about 5 mm of the bottom 332. In certain embodiments, a distal end 334 of the elongated pad tip 328 contacts the bottom 332.

Referring now to FIGS. 4A&B, a cross-sectional view of another embodiment of an apparatus of this disclosure, generally 400, is shown to include a container 402 having a neck 404 having threads 406 and a cap 408 having threads 410, an aperture 412, and an O-ring 414 associated with the aperture 412, wherein the neck threads 406 and the cap threads 410 are designed to engage each other to make a liquid tight seal. The container 402 is shown here filled with a liquid composition of this disclosure 416 to a fill line 418. The apparatus 400 also includes an applicator 420 comprising an elongated cylindrical member 422 having a grip 424 at its proximal end 426 and a square pad tip 428 at its distal end 430. The aperture 412 is designed to receive the applicator 420 so that when the applicator distal end 430 is inserted into and through the aperture 408, the O-ring 414 makes a liquid tight seal with the elongated cylindrical member 422 and the square pad tip 428 is in the liquid 412 near a bottom 432 of the container 402, wherein near means with about 5 mm of the bottom 432. In certain embodiments, a distal end 434 of the square pad tip 428 contacts the bottom 432.

Referring now to FIGS. 5A&B, a cross-sectional view of another embodiment of an apparatus of this disclosure, generally 500, is shown to include a container 502 having a neck 504 having threads 506 and a cap 508 having threads 510, an aperture 512, and a snap ring female connector 514 associated with the aperture 512, wherein the neck threads 506 and the cap threads 510 are designed to engage each other to make a liquid tight seal. The container 502 is shown here filled with a liquid composition of this disclosure 516 to a fill line 518. The apparatus 500 also includes an applicator 520 comprising a snap ring 522 including a male snap ring connector 524, a circular groove 526, and a triangular shaped application member 528 having a lip 530 and a point 532. The snap ring 522 is designed to snap into the cap 508 so that the male snap connector 524 engages the female snap connector 514 forming a liquid tight seal. The lip 530 is adapted to fit or fits into the circular groove 526 so that a bottom 534 of the triangular shaped member 528 comes in contact with the liquid 516 in the container 502, when the container 502 is inverted. The triangular shaped member 528 comprises a liquid permeable or semi-permeable material.

Referring now to FIGS. 6A&B, a cross-sectional view of another embodiment of an apparatus of this disclosure, generally 600, is shown to include a container 602 having a neck 604 having threads 606 and a cap 608 having threads 610, an aperture 612, and a snap ring female connector 614 associated with the aperture 612, wherein the neck threads 606 and the cap threads 610 are designed to engage each other to make a liquid tight seal. The container 602 is shown here filled with a liquid composition of this disclosure 616 to a fill line 618. The apparatus 600 also includes an applicator 620 comprising a snap ring 622 including a male snap ring connector 624, a circular groove 626, and an application member 628 having a base section 630 having a lip 632, a cylindrical section 634, and triangular section 636 having a point 638. The snap ring 622 is designed to snap into the cap 608 so that the male snap ring connector 624 engages the female snap connector 614 forming a liquid tight seal. The lip 630 is adapted to fit or fits into the circular groove 626 so that a bottom 640 of the member 628 comes in contact with the liquid 616 in the container 602, when the container 602 is inverted. The application member 628 comprises a liquid permeable or semi-permeable material.

Referring now to FIGS. 7A&B, a cross-sectional view of another embodiment of an apparatus of this disclosure, generally 700, is shown to include a container 702 having a neck 704 having threads 706 and a cap 708 having threads 710, an aperture 712, and a snap ring female connector 714 associated with the aperture 712, wherein the neck threads 706 and the cap threads 710 are designed to engage each other to make a liquid tight seal. The container 702 is shown here filled with a liquid composition of this disclosure 716 to a fill line 718. The apparatus 700 also includes an applicator 720 comprising a snap ring 722 including a male snap ring connector 724, a circular groove 726, and an application member 728 having a lip 730 and a tapered cylindrical portion 732 having a flat top 734. The snap ring 722 is designed to snap into the cap 708 so that the male snap ring connector 724 engages the female snap connector 714 forming a liquid tight seal. The lip 730 is adapted to fit or fits into the circular groove 726 so that a bottom 736 of the application member 728 comes in contact with the liquid 716 in the container 702, when the container 702 is inverted. The application member 728 comprise a liquid permeable or semi-permeable material.

Referring now to FIGS. 8A&B, a cross-sectional view of another embodiment of an apparatus of this disclosure, generally 800, is shown to include a container 802 having a neck 804 having threads 806 and a cap 808 having threads 810, an aperture 812, and a snap ring female connector 814 associated with the aperture 812, wherein the neck threads 806 and the cap threads 810 are designed to engage each other to make a liquid tight seal. The container 802 is shown here filled with a liquid composition of this disclosure 816 to a fill line 818. The apparatus 800 also includes an applicator 820 comprising a snap ring 822 including a male snap ring connector 824, a circular groove 826, and an application member 828 having a lip 830 and a tapered portion 832 having a flat top 834. The snap ring 822 is designed to snap into the cap 808 so that the male snap ring connector 824 engages the female snap connector 814 forming a liquid tight seal. The lip 830 is adapted to fit or fits into the circular groove 826 so that a bottom 836 of the application member 828 comes in contact with the liquid 816 in the container 802, when the container 802 is inverted. The application member 828 comprise a liquid permeable or semi-permeable material.

Figure 9:
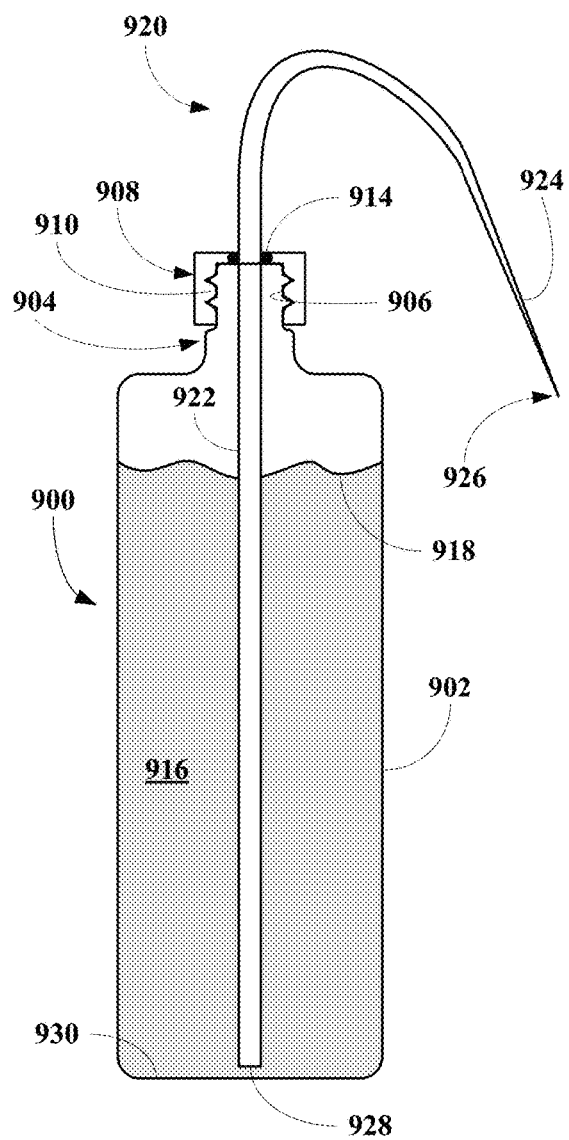
FIG. 9 depicts a cross-sectional view of another embodiment of an apparatus of this disclosure including a container including an applicator having a tapered end.

Referring now to FIG. 9, a cross-sectional view of another embodiment of an apparatus of this disclosure, generally 900, is shown to include a container 902 having a neck 904 having threads 906 and a cap 908 having threads 910, an aperture 912, and an O-ring 914 associated with the aperture 912, wherein the neck threads 906 and the cap threads 910 are designed to engage each other to make a liquid tight seal. The container 902 is shown here filled with a liquid composition of this disclosure 916 to a fill line 918. The apparatus 900 also includes an applicator 920 comprising an elongated cylindrical member 922 having a tapered applicator tip 924 at its proximal end 926 and having a distal end 928 disposed near a bottom 930 of the container 902.

Figure 10:
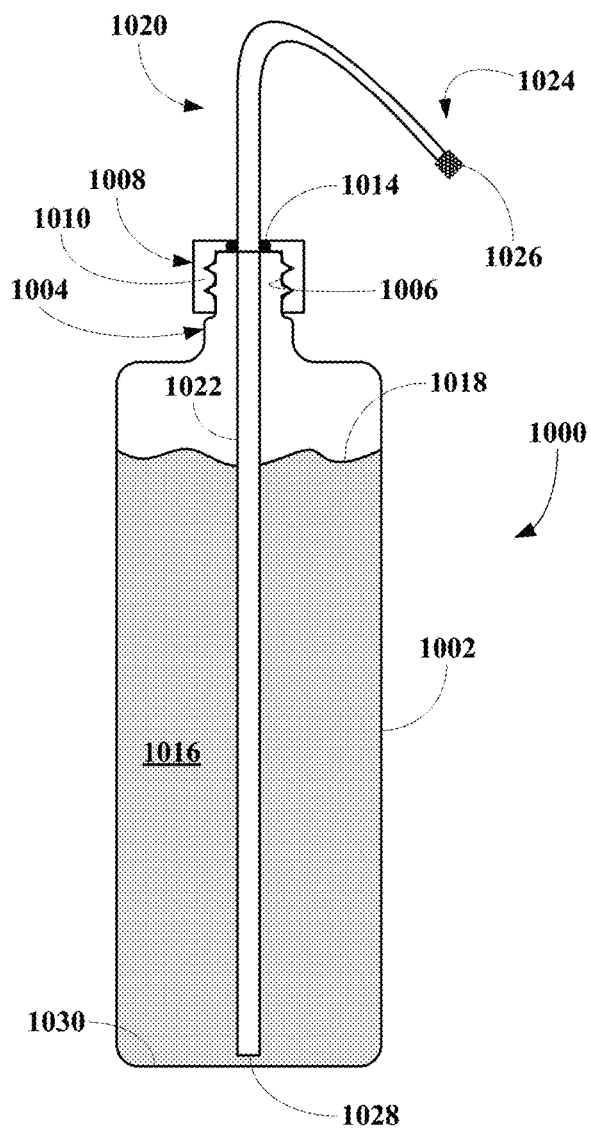
FIG. 10 depicts a cross-sectional view of another embodiment of an apparatus of this disclosure including a container including an applicator having a tapered end terminating in a sponge.

Referring now to FIG. 10, a cross-sectional view of another embodiment of an apparatus of this disclosure, generally 1000, is shown to include a container 1002 having a neck 1004 having threads 1006 and a cap 1008 having threads 1010, an aperture 1012, and an O-ring 1014 associated with the aperture 1012, wherein the neck threads 1006 and the cap threads 1010 are designed to engage each other to make a liquid tight seal. The container 1002 is shown here filled with a liquid composition of this disclosure 1016 to a fill line 1018. The apparatus 1000 also includes an applicator 1020 comprising an elongated cylindrical member 1022 having a tapered applicator proximal end 1024 terminating in an application sponge tip 1026 and having a distal end 1028 disposed near a bottom 1030 of the container 1002.

Figure 11:
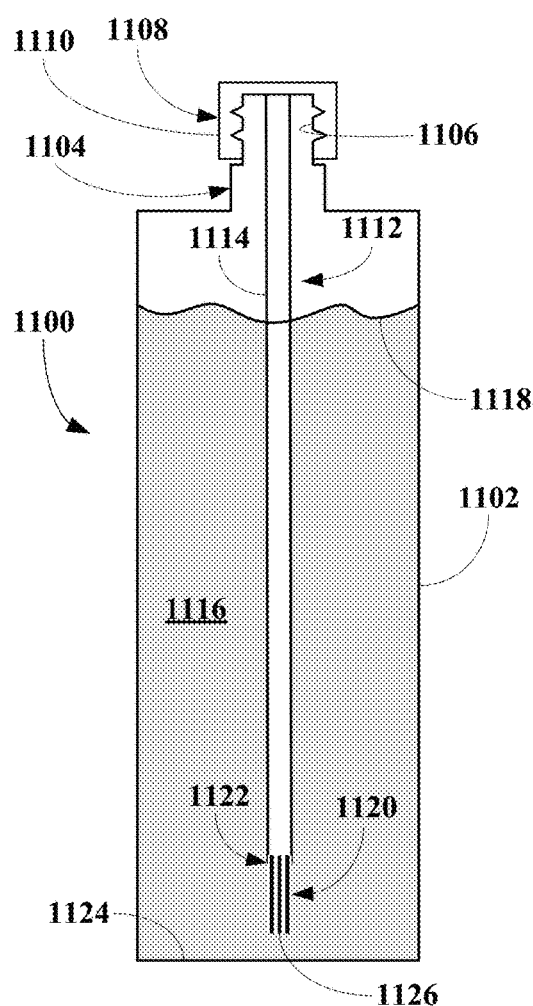
FIG. 11 depict a cross-sectional view of another embodiment of an apparatus of this disclosure including a container including a cap having an applicator ending in a brush.

Referring now to FIG. 11, a cross-sectional view of another embodiment of an apparatus of this disclosure, generally 1100, is shown to include a container 1102 having a neck 1104 having threads 1106 and a cap 1108 having threads 1110 and an applicator 1112 comprising an elongated cylindrical member 1114. The container 1102 is shown here filled with a liquid composition of this disclosure 1116 to a fill line 1118. The elongated cylindrical member 1114 includes a brush tip 1120 at its distal end 1122 so that when the cap 1108 is screwed onto the container 1102, the brush tip 1120 is in the liquid 1116 near a bottom 1124 of the container 1102, wherein near means with about 5 mm of the bottom 1124. In certain embodiments, a distal end 1126 of the brush tip 1120 contacts the bottom 1124.

Figure 12:
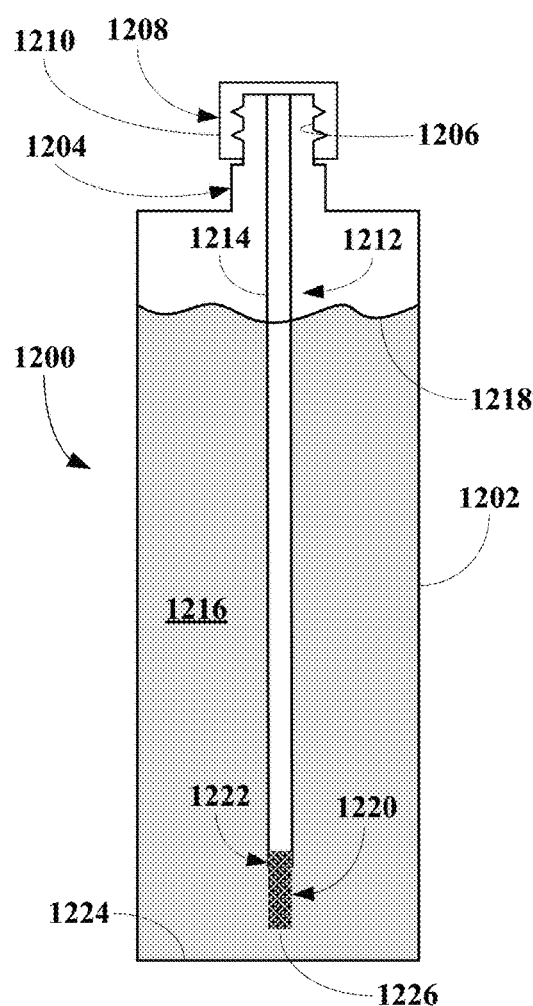
FIG. 12 depict a cross-sectional view of another embodiment of an apparatus of this disclosure including a container including a cap having an applicator ending in a sponge.

Referring now to FIG. 12, a cross-sectional view of another embodiment of an apparatus of this disclosure, generally 1200, is shown to include a container 1202 having a neck 1204 having threads 1206 and a cap 1208 having threads 1210 and an applicator 1212 comprising an elongated cylindrical member 1214. The container 1202 is shown here filled with a liquid composition of this disclosure 1216 to a fill line 1218. The elongated cylindrical member 1214 includes a sponge tip 1220 at its distal end 1222 so that when the cap 1208 is screwed onto the container 1202, the brush tip 1220 is in the liquid 1216 near a bottom 1224 of the container 1202, wherein near means with about 5 mm of the bottom 1224. In certain embodiments, a distal end 1226 of the sponge tip 1220 contacts the bottom 1224.

Referring now to FIG. 13, a cross-sectional view of another embodiment of an apparatus of this disclosure, generally 1300, is shown to include a container 1302 having a neck 1304 having threads 1306 and a cap 1308 having threads 1310 and an applicator 1312 comprising an elongated cylindrical member 1314. The container 1202 is shown here filled with a liquid composition of this disclosure 1316 to a fill line 1318. The elongated cylindrical member 1314 includes a sponge tip 1320 at its distal end 1322 so that when the cap 1308 is screwed onto the container 1302, the elongated pad tip 1320 is in the liquid 1316 near a bottom 1324 of the container 1302, wherein near means with about 5 mm of the bottom 1324. In certain embodiments, a distal end 1326 of the elongated pad tip 1320 contacts the bottom 1324.

Referring now to FIG. 14, a cross-sectional view of another embodiment of an apparatus of this disclosure, generally 1400, is shown to include a container 1402 having a neck 1404 having threads 1406 and a cap 1408 having threads 1410 and an applicator 1412 comprising an elongated cylindrical member 1414. The container 1202 is shown here filled with a liquid composition of this disclosure 1416 to a fill line 1418. The elongated cylindrical member 1214 includes a sponge tip 1420 at its distal end 1422 so that when the cap 1208 is screwed onto the container 1202, the brush tip 1220 is in the liquid 1216 near a bottom 1424 of the container 1202, wherein near means with about 5 mm of the bottom 1224. In certain embodiments, a distal end 1426 of the sponge tip 1220 contacts the bottom 1224.

Figure 15:
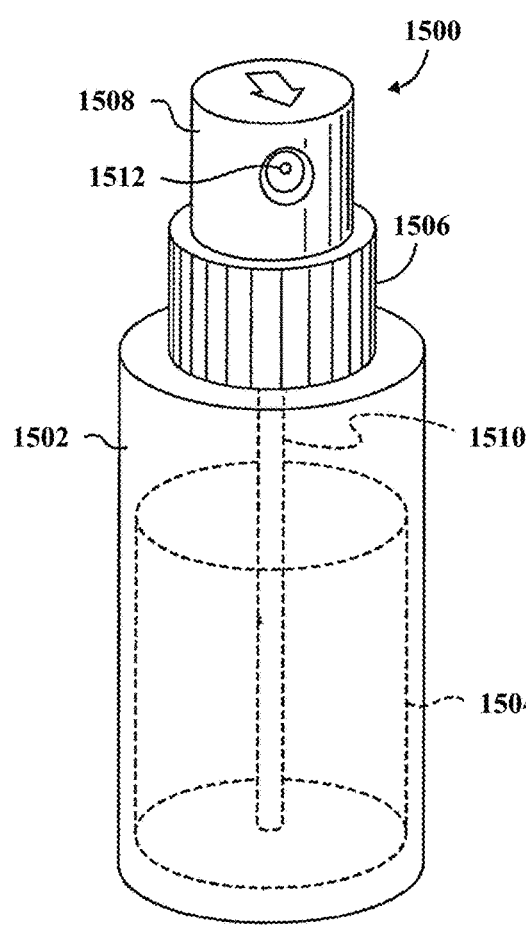
FIG. 15 depict a cross-sectional view of another embodiment of an apparatus of this disclosure including an aerosol container.

Referring now to FIG. 15, a spray bottle, generally 1500, is shown to include a spray bottle 1502 and a liquid compound 1504, which is selectively discharged and atomized by the spray bottle 1502. The liquid compound 1504 is a composition of this disclosure that temporarily enhances the luster and brilliance of the jewelry and/or gem stones. The spray bottle 1502 may be a manual pump action bottle with a screw type top 1506 containing a conventional internal pump assembly (not shown), and a spray nozzle tip 1508. The spray bottle 1502 is a small hand-held bottle that may be easily inserted into and/or stored within a user's purse or pocket. The internal pump assembly is fed by a pickup tube 1510, which is attached to the pump assembly and is suspended into the open cavity of the supply bottle 1502 and thus into the liquid compound 1504. The spray nozzle tip 1508 is operatively disposed on top of the internal pump assembly, such that, when the spray nozzle tip 1508 is depressed by the finger of a user, the internal pump assembly is depressed, which in turn collapses an internal cavity within the pump assembly. When the spray nozzle tip 1508 is depressed by the finger of a user for the very first time no liquid compound is discharged. However, when the spray nozzle tip 1508 is released, the internal pump assembly returns to its undepressed position by an internal spring action. As the internal pump assembly moves upwards, the expansion in its internal cavity creates a suction which draws a portion of the liquid compound 1504 contained in the supply bottle 1502 up through the pick up tube 1510. The drawn liquid compound 1504 remains within the expanded internal cavity of the pump assembly until the spray nozzle tip 1508 is again depressed. Then, when the spray nozzle tip 1508 and internal pump assembly are depressed by the finger of the user the second time and any time thereafter, an internal cavity within the pump assembly collapses. Since the cavity of the internal pump assembly has been filled with the liquid compound 1504 from the spray bottle 1502 by the previous depression of the spray tip 1508, this stored portion of the liquid compound 1504 is forced out through the atomizing opening 1512 of the nozzle tip 1508. This creates a propelled spray or mist of the liquid compound 1504. Then as the spray nozzle tip 1508 is released, the internal cavity of the pump assembly is refilled with the drawn liquid compound 1504 awaiting the next pump action as described above.

Figure 16:
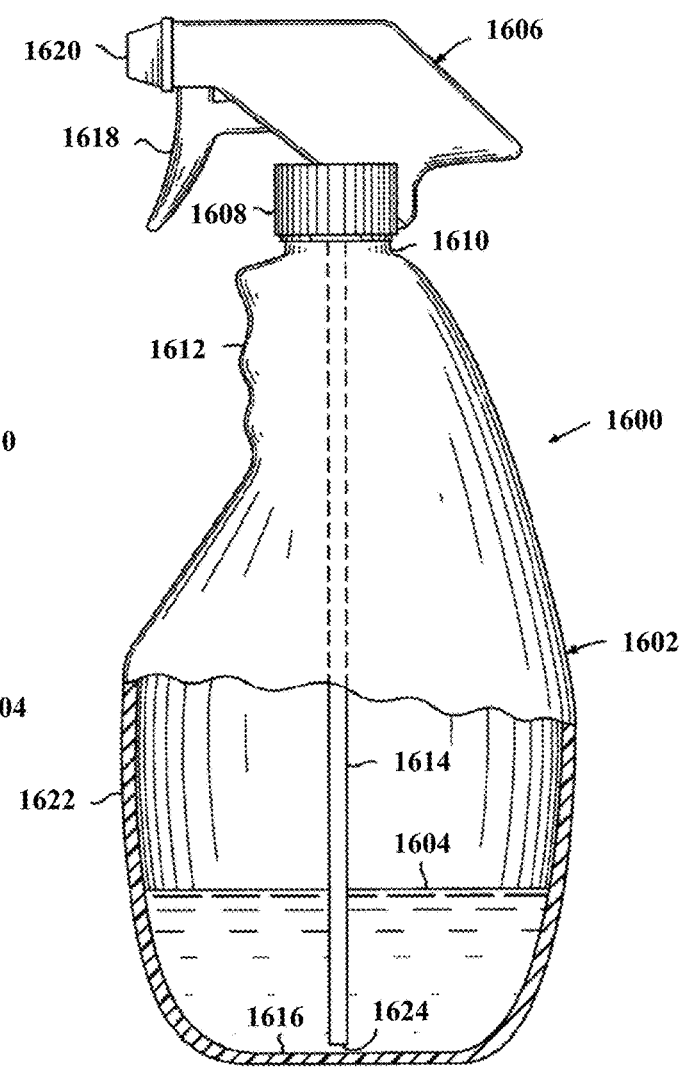
FIG. 16 depict a cross-sectional view of another embodiment of an apparatus of this disclosure including an aerosol container.

Referring now to FIG. 16, a spray bottle, generally 1600, is shown to include a bottle or reservoir portion 1602 which will hold a fluid 1604 to be dispensed from the bottle 1602 by a spray or pump mechanism 1606, which usually is included in a cap 1608 closing the neck portion 1610 of the bottle 1602. The bottle 1602 may be made in any convenient shape such as shown here wherein an upper portion 1612 of bottle 1602 has the general shape of a pistol grip. The spray mechanism 1606 includes a dip or siphon tube 1614 that extends toward the bottom 1616 of the bottle 1602 so that the fluid 1604 inside the bottle 1602 may be pumped, by activating trigger 1618, through the siphon tube 1614 to a spray nozzle 1620 for dispensing. The siphon tube 1614 is generally vertical and extends to a location proximate the bottom 1616 of the spray bottle 1602 as shown here. When the spray bottle 1602 is held in a vertical position almost all of the liquid can be dispensed using the spray mechanism 1606. The fluid moves toward a front wall 1622 of the bottle 1602, thus leaving an end 1624 of siphon tube 1614 no longer submerged in fluid 1604. In this position the spray mechanism will withdraw air from the bottle 1602, not the fluid 1604.

Figure 17:
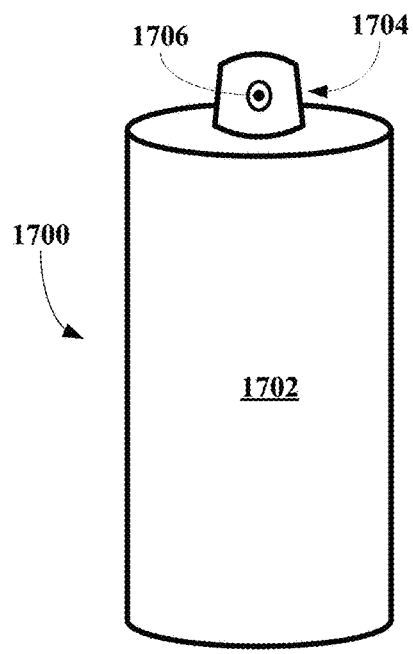
FIG. 17 depict a cross-sectional view of another embodiment of an apparatus of this disclosure including a spray container.

Referring now to FIG. 17, an aerosol spray apparatus, generally 1700, is shown to include an aerosol bottle 1702 containing a composition of the present disclosure and a propellant. The bottle 1702 also includes a spray nozzle 1704 having an orifice 1706.

Figure 18:
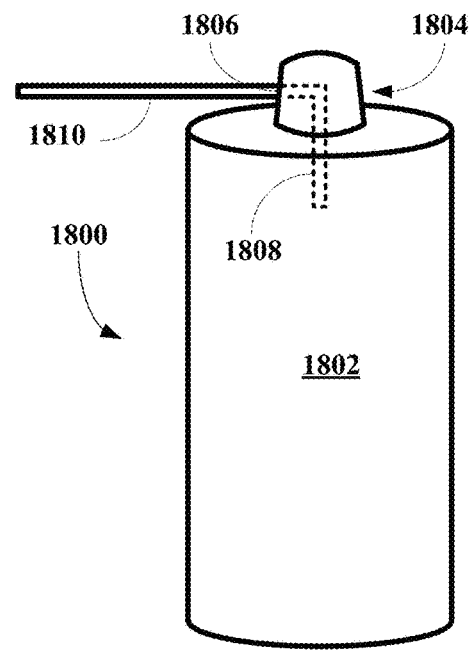
FIG. 18 depict a cross-sectional view of another embodiment of an apparatus of this disclosure including a spray container.

Referring now to FIG. 18, an aerosol spray apparatus, generally 1800, is shown to include an aerosol bottle 1802 containing a composition of the present disclosure and a propellant. The bottle 1802 also includes a spray nozzle 1804 having an orifice 1806 associated with liquid conduit 1808 and a spray director tube 1810.

Figure 19:
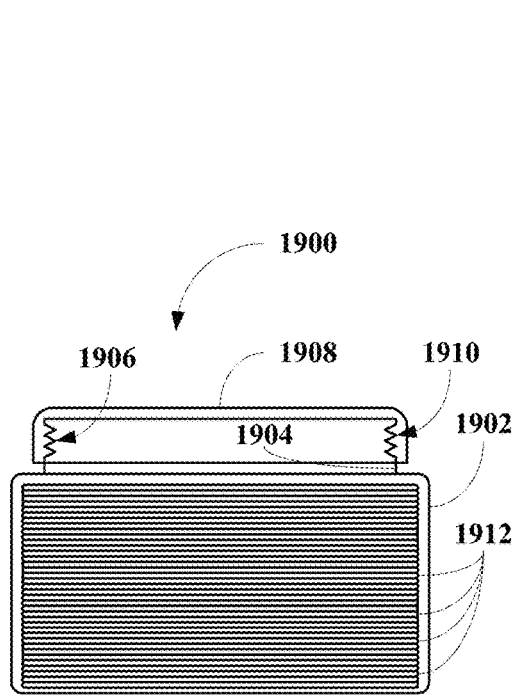
FIG. 19 depict a cross-sectional view of another embodiment of an apparatus of this disclosure including a container including application pads.

Referring now to FIG. 19, an pad dispensing apparatus, generally 1900, is shown to include a container 1902 having a neck 1904 including threads 1906 and a cap 1908 having threads 1910, wherein the neck thread 1906 are designed to engage the cap thread 1910 to form a liquid tight seal. The container 1902 includes a plurality of application pads 1912 saturated with a composition of this disclosure.

Figure 20B:
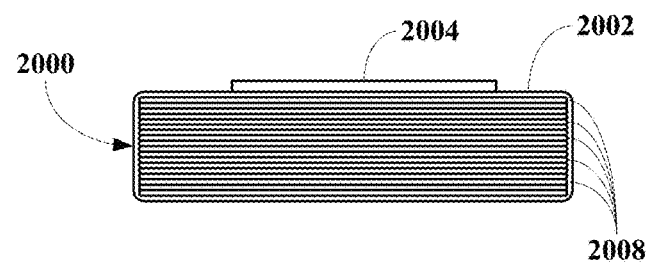

Referring now to FIG. 20, another pad dispensing apparatus, generally 2000, is shown to include a packaging 2002 having an opening flap 2004 having a pull tab 2006. The packaging 2002 includes a plurality of application pads 2008 saturated with a composition of this disclosure.

EXPERIMENTS OF THE DISCLOSURE

Example 1

This examples illustrates the application of a mineral oil based composition of this disclosure including an essential oil for scent to a ring.

Referring now to FIGS. 21A&B, photographs showing of a ring before and after the application of the enhancing composition. It is clear from the photographs of the ring has greater luster and brilliance as shown in FIG. 21B than the untreated ring in FIG. 21A.

Example 2

This examples illustrates the application of a mineral oil based composition of this disclosure including another essential oil for scent to a ring and a watch.

Referring now to FIGS. 22A&B, photographs showing of a ring and a watch before and after the application of the enhancing composition. It is clear from the photographs of the ring and the watch has greater luster and brilliance as shown in FIG. 22B than the untreated ring and watch in FIG. 22A.

Example 3

This examples illustrates the application of a mineral oil based composition of this disclosure including another essential oil for scent to a ring.

Referring now to FIGS. 23A&B, photographs showing of a ring before and after the application of the enhancing composition. It is clear from the photographs of the ring has greater luster and brilliance as shown in FIG. 23B than the untreated ring in FIG. 23A.

Example 4

This examples illustrates the application of a mineral oil based composition of this disclosure including another essential oil for scent to a ring.

Referring now to FIGS. 24A&B, photographs showing of a ring before and after the application of the enhancing composition. It is clear from the photographs of the ring has greater luster and brilliance as shown in FIG. 24B than the untreated ring in FIG. 24A.

Example 5

This examples illustrates the application of a mixtures of glycerine, *Butyrospermum parkii* fruit butter, and *Theobroma cacao* butter based of this disclosure to a multiple diamond ring.

Referring now to FIGS. 25A&B, photographs showing of the ring before and after the application of the Example 5 composition. It is clear from the photographs of the ring has greater luster and brilliance as shown in FIG. 25B than the untreated ring in FIG. 25A.

Example 6

This examples illustrates the application of a mixtures of glycerine, *Butyrospermum parkii* fruit butter, and *Theobroma cacao* butter based of this disclosure to a single diamond ring.

Referring now to FIGS. 26A&B, photographs showing of the ring before and after the application of the Example 6 composition. It is clear from the photographs of the ring has greater luster and brilliance as shown in FIG. 26B than the untreated ring in FIG. 26A.

Example 7

This examples illustrates the application of a mixtures of glycerine, *Butyrospermum parkii* fruit butter, and *Theobroma cacao* butter based of this disclosure to the single diamond ring.

Referring now to FIG. 27, photographs showing the Example 7 composition being applied to the ring using a brush applicator of this disclosure.

Closing Paragraph of the Disclosure

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

We claim:

1. A method comprising: applying, onto a piece of jewelry, a gem stone, or a piece of jewelry including a gem stone, a non-aqueous composition comprising: between about 99.98% and about 90% of anon-aqueous carrier, between about 0.01% and about 5% of one or more fragrances, and between about 0.01% and about 5% of one or more phospholipids, one or more amphoteric glycinates, one or more amphoteric betaines, one or more amphoteric imidazolines, one or more amphoteric propionates, one or more other amphoteric agents, or mixtures thereof; wherein the non-aqueous carrier including: one or more ene er mere fatty acids, one or more glycerides, one or more essential oils, one or more hydrocarbons, one or more petroleum oils, or mixtures thereof, the one or more phospholipids are selected from the group consisting of: (1) diacylglyceridephospholipids or glycerophospholipids selected from the group consisting of phosphatidic acid (phosphatidate) (PA), phosphatidylethanolamine (cephalin) (PE), phosphatidylcholine (lecithin) (PC), phosphatidylserine (PS), and mixture thereof; (2) phosphoinositides selected from the group consisting of phosphatidylinositol (PI), phosphatidylinositol phosphate (PIP), phosphatidylinositol bisphosphate (PIP2) and phosphatidylinositol triphosphate (PIP3), and mixture thereof; (3) phosphosphingolipids selected from the group consisting of ceramide phosphorylcholine (Sphingomyelin) (SPH), ceramide phosphorylethanolamine (Sphingomyelin) (Cer-PE), ceramide phosphorylglycerol, and mixture thereof; and (4) mixtures thereof; or the one or more amphoteric acetates are selected from the group consisting of lauroarnphoacetate, alkyl amphoacetate, cocoampho(di) acetate, cocoarnphoacetate, cocoamphodiacetate, disodium cocoamphodiacetate, sodium cocoamphoacetate, sodium lauroamphoacetate, disodium cocoamphodiacetate, disodium capryloamphodiacetate, disodium lauroamphoacetate, disodium wheatgermamphodiacetate, cocoarnphoacetate, cocoamphoace tate, cocoamphoacetate, cocoamphoacetate and cocoamphodiacetate, disodium cocoamphodiacetate, or mixtures thereof; or the one or more amphoteric betaines are selected from the group consisting of cocamidopropyl betaine, sodium lauroamphoace, cocoamidopropyl hydroxy sulfo baden (CHSB), dodecyl dimethyl betaine, cetyl betaine, lauroarnphoacetate, alkyl amphoacetate, cocoampho(di)acetate, cocoarnphoacetate, cocoamphodiacetate, disodium cocoamphodiacetate, sodium cocoamphoacetate, sodium lauroamphoacetate, disodium cocoamphodiacetate, disodium capryloamphodiacetate, disodium lauroamphoacetate, disodium wheatgermamphodiacetate, cocoarnphoacetate, alkylamido baden, alkyldimethyl betaine, cocoamidopropylbetaine, tallowbis(hydroxyethyl)baden, hexadecyldimethylbetaine, alkyl amido propyl sulfo baden, alkyl dimethyl amine baden, coco amido propyl dimethyl baden, alkyl amido propyl dimethyl amine baden, cocamidopropyl baden, lauryl betaine, laurylamidopropyl betaine, coco amido baden, lauryl amido baden, dimethiconepropyl PG-betaine, N-alkyldimethylbetaine, coco biguamide derivative, cetyl baden, oleamidopropyl betaine, isostearamidopropyl betaine, oleyl betaine, wheatgermamidopropylbetaine, cocamidopropyl betaine, lauramidopropylbetaine, 2-alkyl-N-carboxymethyl-N-hydroxyethyl imidazolinium baden, cocamidopropyl betaine, isostearamidopropylbetaine, myristamidopropylbetaine, palmitamidopropyl betaine, cocamidopropyl hydroxy sultaine, ammonium chloride cocamidopropyl hydroxy sultaine and potassium chloride, cocamidopropyl hydroxy sultaine, undecylenamidopropylbaden, wheatgermamidopropylbetaine, or mixture thereof; or the one or more amphoteric glycinates are selected from the group consisting of cocoamphocarboxyglycinate, tallowamphocarboxyglycinate, oleoamphocarboxyglycinate, cocoiminodiglycinate, capryloamphocarboxyglycinate, bis-2-hydroxyethyl tallow glycinate, lauryl amphoglycinate, oleic polyamphoglycinate, C10/12-fatty acid amidoethyl-N-(2-hydroxyethyl)-glycinate, C12/18-fatty acid amidoethyl-N-(2-hydroxyethyl)-glycinate, dihydroxyethyl tallow glycinate, or mixtures thereof; or the one or more amphoteric imidazolines are selected from the group consisting of 2-alkyl-I-(ethyl-beta-oxipropanoianoic) imidazoline sodium salt based on caprylic acid, 1-hydroxyethyl-2-alkylimidazoline, coco imidazoline, tall oil imidazoline, lauryl imidazoline, coco imidazoline dicarboxymethylated, sodium copra dicarboxylic imidazoline, oleyl imidazoline or mixtures thereof; or the one or more amphoteric propionates are selected from the group consisting of cocoiminodipropionate, octyliminodipropionate, cocoalkylaminopropionic acid, cocoamphodipropionate, lauraminopropionic acid, disodium tallow-p-iminodipropionate, monosodium-N-lauryl p-iminodipropionic acid, disodium lauriminodipropionate, sodium lauriminopropionic acid, 2-ethylhexylamino dipropionate, coco amino dipropionate, cocaminopropionicacid, lauraminopropionic acid, sodium lauriminodipropionate, disodium cocoamphodipropionate, disodium capryloamphodipropionate, disodium lauroamphodipropionate, sodium cocoamphopropionate, sodiumlauriminodipropionate, sodiumalkyliminopropionate or mixtures thereof; or the one or more other amphoteric agents are selected from the group consisting of N-coco-3-aminobutyric acid, sodium salt, N-coco-3-aminobutyric acid, ethoxylated fatty alcohol carboxym, cocamidopropyl hydroxy sultaine, sodium cocoamphohydroxypropyl sulfonate, sodium capryloarnphohydroxy propylsulfonate and mixtures or combinations thereof, and wherein the composition is adapted to temporarily enhance a luster and/or brilliance of the piece of jewelry, the gem stone, or the piece of jewelry including a gem stone.

2. The method of claim 1, wherein, in the applying step, the composition further comprising:
one or more fragrances.

3. The method of claim 2, wherein, in the applying step, the composition further comprises:
between about 99.99% and about 95% of the non-aqueous carrier, and
between about 0.01% and about 5% of one or more fragrances.

4. The method of claim 2, wherein, in the applying step:
the one or more fragrances are selected from the group consisting of absinthe, acai berry, agave, allspice, almond, aloe, amaretto, amber, ambergris, ambrosia, anise, apple blossom, apple, appletini, apricot, asian pear, asian plum, avocado, azalea, bacon, balsam pine, balsam fir, bamboo, banana, basil, bay leaf, bayberry, beragamot, birds of paradise, black licorice, black tea, black currant, black cherry, black raspberry, black fig, blackberry, blueberry, boysenberry, brown sugar, bubble gum, butter rum, butter pecan, butterscotch, cafe mocha, calla lily, camphor, candy cane, candy corn, cannabis flower, cantaloupe, cappuccino, caramel, cardamon cedar blossom, carnation, casablanca lily, cassia, cassis, cedar, chai tea, chamomile, champagne, chardonnay, cherry blossom, cherry, chestnuts, chili pepper, chocolate, chrysanthemum, churo, chypre, cilantro, cinnamon, citron, citronella, elementine, clove, clover, cocoa butter, coconut, coffee, cognac, cola, concord grape, corn, cotton candy, crab apple, cranberry, creme brulee, cucumber, cyclamen, cyprus, daffodil, dahlia, daisy, dandelion, delphinium, dewberry, dirt, dogwood, douglas fir, driftwood, egg nog, elderberry, english lavender, english ivy, eucalyptus, evergreen, expresso, fern, fig, forsythia, frangipan, frankincense, freesia, fresh cut grass, gardenia, geranium, ginger, ginger blossom, ginger snap, gingerbread, gladiola, gooseberry, grape, grapefruit, green tea, guarana, guava, hazelnut, heliotrope, hemlock, hibiscus, hollyberry, honey, honeysuckle, huckleberry, hyacinth, hydrangea, impatiens, iris, irish cream, jasmine, juniper, kailua, key lime, kiwi, kumquat, lavanda, lavender, leather, lemon grass, lemon, lemon peel, lemon lime, licorice, lilac, lily of the valley, lily, lime, loganberry, lotus blossom, lotus, macadamia nut, macaron, magnolia, mandarin, mango, maple, maple syrup, margarita, marichino cherry, maricopa, marigold, marmalade, marshmallow, mayan gold, melon, menthol, merlot wine, milk, mimosa, mint, mistletoe, mojito, morning glory, moss, mulberry, mulled cider, muscadine, musk, myrrh, nag champp, narcissus, nectarine, neroli, neutroleum alpha, nutmeg, oak, oakmoss, oatmeal, olive blossom, olive, orange, orange blossom, orange peel, orchid, orchid blossom, orris root, pansy, papaya, passion fruit, passion flower, patchouli, peach, peach blossom, peach cobbler, peanut butter, pear, pecan, peony, peppercorn, peppermint, peppermint stick, periwinkle, persimmon, pikake flowers, pina colada, pine, pineapple, pinion, pink lemonade, pink grapefruit, pistachio, pizza, plum, plumeria, poinsettia, pomegranate, popcorn, poppy, poppyseed, potpourri, pralines, primrose, pumpkin, rain, raisin, raspberry, red cherry, red currant, red raspberry, redwood embers, rhubarb, roasted chestnut, root beer, rose, rosemary, rosewood, ruby red grapefruit, rum, sage, sandalwood, sassafras, satsuma, shea, shiraz, shortbread, smoke, snapdragon, snicker doodle, spearmint, spruce, strawberry, suntan oil, sweet grass, sweet pea, syringa, taffy, tangerine, teaberry, teakwood, thyme, thyme, tiger lily, tobacco, toffee, tomato, tonka bean, truffle, tuberose, tulip, tutti fruitti, vanilla, verbena, vetiver, violet, vitiver wood, wassail, water lily, watermelon, white chocolate, wild grass, wintergreen, wintermint, wisteria, woodberry, woodland, ylang ylang, yuzu, zinfindel, zinnia, and mixtures thereof.

5. The method of claim 1, wherein, in the applying step:
the one or more fatty acids are selected from the group consisting of saturated fatty acid, unsaturated fatty acids, and mixtures thereof;
the one or more glycerides are selected from the group consisting of mono-glycerides, di-glyceride, triglycerides, and mixtures thereof;
the one or more hydrocarbons are selected from the group consisting of alkanes having between six and 30 carbon atoms, alkenes between six and 30 carbon atoms, alkylated aromatic hydrocarbons having between 10 and 30 carbon atoms, and mixtures thereof, wherein one or more of the carbon atoms may be replaced by an nitrogen, an oxygen, a sulfur atom, or mixtures thereof;
the one or more petroleum oils are selected from the group consisting of distilled petroleum, polyalphaolefins, mineral spirits, and mixtures thereof.

6. The method of claim 5, wherein, in the applying step: the one or more glycerides are selected from the group consisting of animal oils, plant oils, and mixtures thereof.

7. The method of claim 6, wherein, in the applying step: the plant oils are selected from the group consisting of amaranth oil, almond oil, apricot oil, argan oil, artichoke oil, avocado oil, babassu oil, ben oil, borneo tallow nut oil, buffalo gourd oil, canola oil, carob pod oil, algaroba oil, cashew oil, coconut oil, coriander seed oil, corn oil, false flax oil, grape seed oil, hazlenut oil, hemp oil, hibiscus seed oil, kapok seed oil, lallemantia oil, macadamia oil, meadowfoam seed oil, mustard oil, okra seed oil, olive oil, palm oil, peanut oil, pecan oil, perilla seed oil, pequi oil, pine nut oil, pistachio oil, poppyseed oil, prune kernel oil, pumpkin seed oil, quinoa oil, ramtil oil, rapeseed oil, rice bran oil, safflower oil, sesame oil, soybean oil, sunflower oil, tea oil, camellia oil, thistle oil, walnut oil, wheat germ oil, and mixtures thereof.

8. The method of claim 1, wherein, in the applying step: the piece of jewelry comprises a ring, a brooch, a pendant, a necklace, a bracelet, an ear ring, or a watch; and the gem stone is selected from the group consisting of actinolite, nephrite, adamite, aegerine, afghanite, agate, irisagate, onyx, sardonyx, agrellite, albite, alunite, amblygonite, analcime, anatase, andalusite, chiastolite, andesine, anglesite, anhydrite, annabergite, antigorite, bowenite, apatite, apophyllite, aragonite, arfvedsonite, astrophyllite, atacamite, austinite, ferroaxinite, magnesioaxinite, manganaxinite, tinzenite, azurite, baryte, bastnaesite, bayldonite, benitoite, aquamarine, bixbite, emerald, goshenite, goldenberyl, heliodor, morganite, beryllonite, beudantite, biotite, boleite, boracite, bornite, brazilianite, bronzite, brookite, brucite, bustamite, bytownite, calcite, manganocalcite, caledonite, cancrinite, vishnevite, carletonite, carnallite, carnelian, cassiterite, cavansite, celestite (celestine), cerussite, chabazite, chalcopyrite, chambersite, charlesite, charoite, childrenite, chloromelanite, chondrodite, chrysoberyl, alexandrite, cymophane, chromite, chrysocolla, chrysoprase, chrysotile, cinnabar, citrine, clinochlore, clinohumite, clinozoisite, clintonite, cordierite, iolite, corundum, ruby, sapphire, covellite, creedite, cryolite, cuprite, danburite, datolite, diamond, bort, diaspore, diopside, dioptase, dolomite, dravite, dumortierite, elbaite, emerald, trapicheemerald, enstatite, bronzite, hypersthene, eosphorite, epidote, piemontite, erythrite, esperite, ettringite, euclase, eudialyte, fayalite, ferroaxinite, andesine, albite, anorthite, anorthoclase, amazonite, bytownite, celsian, labradorite, microcline, moonstone, orthoclase, sanidine, sunstone, fluorapatite, fluorapophyllite, fluorite, forsterite, gahnite, pyralspite, almandine, pyrope, spessartine, ugrandite, andradite, demantoid, melanite, topazolite, grossular, hessonite, hydrogrossular, tsavorite, uvarovite, almandine-pyrope, rhodolite, andradite-grossular, grandite, pyrope-almandine-spessartine, malaiagarnet, pyrope-spessartine, umbalite, gaspeite, gaylussite, gibbsite, glaucophane, goethite, goosecreekite, grandidierite, gypsum, gyrolite, hackmanite, halite, hambergite, hanksite, hardystonite, hauyne, hematite, hemimorphite, herderite, hexagonite, hibonite, hiddenite, hodgkinsonite, howlite, humite, hypersthene, iolite, jade, jadeite, nephrite, jasper, radiolarite, jeremejevite, kainite, kornerupine, kunzite, kutnohorite, kurnakovite, kyanite, langbeinite, lapislazuli, larimar, lawsonite, lazurite, legrandite, lepidolite, leucite, leucophanite, linarite, lizardite, londonite, ludlamite, magnesite, malachite, marialite-meionite, wernerite, mimetite, moissanite, moonstone, adularia, rainbow, mottramite, muscovite, fuchsite, musgravite, narsarsukite, natrolite, nepheline, neptunite, nickeline, nuummite, opal, painite, papagoite, pargasite, pectolite, larimar, peridot, periclase, petalite (castorite), pezzottaite, phenakite, phlogopite, phosgenite, phosphophyllite, piemontite, pietersite, plumbogummite, pollucite, polyhalite, poudretteite, prasiolite, prehnite, prismatine, proustite, pumpellyite, chlorastrolite, purpurite, pyrite, pyrargyrite, pyromorphite, pyrrhotite, quartz, amethyst, ametrine, chalcedony, agate, irisagate, onyx, sardonyx, bloodstone (heliotrope), carnelian, chromechalcedony, chrysoprase, dendriticagate, mossagate, fireagate (iridescentvar), jasper, petrifiedwood, sard, citrine, druzy, flint, milkyquartz, prasiolite, rosequartz, rockcrystal, smokyquartz, ruby, richterite, rosequartz, rhodizite, rhodochrosite, riebeckite, crocidolite, rosasite, rutile, sapphire, padparadscha, sard, sardonyx, scapolite, scheelite, schorl, scolecite, scorodite, selenite, sellaite, senarmontite, sérandite, seraphinite, serendibite, antigorite, bowenite, chrysotile, lizardite, stichtite, shattuckite, shigaite, shortite, shungite, siderite, sillimanite, sinhalite, smithsonite, sodalite, hackmanite, sperrylite, spessartite, spinel, ceylonite, spodumene, hiddenite, kunzite, triphane, stichtite, staurolite, sulfur, stolzite, sugilite, bustamite, richterite, sylvite, taaffeite, tantalite, thomsonite, thaumasite, tinaksite, titanite (sphene), topaz, achroite, canary, fluor-liddicoatite, indicolite, olenite, paraiba, rossmanite, rubellite, tremolite, hexagonite, tugtupite, turquoise, vanadinite, variscite, väyrynenite, vesuvianite (idocrase), californite, villiaumite, vlasovite, wavellite, weloganite, willemite, wulfenite, xonotlite, zektzerite, zeolites, analcite, apophyllite, chabazite, goosecreekite, natrolite, stellarite, thomsonite, zincite, zinnwaldite, zircon, jacinth, zoisite, tanzanite, thulite, zulta, and mixtures thereof.

9. A method comprising: spraying, onto a piece of jewelry, a gem stone, or a piece of jewelry including a gem stone, a non-aqueous composition comprising: between about 99.98% and about 90% of a non-aqueous carrier, between about 0.01% and about 5% of one or more fragrances, and between about 0.01% and about 5% of one or more phospholipids, one or more amphoteric glycinates, one or more amphoteric betaines, one or more amphoteric imidazolines, one or more amphoteric propionates, one or more other amphoteric agents, or mixtures thereof; a propellant comprising air, nitrogen, argon, carbon dioxide, a mixture of oxygen and nitrogen, or mixtures thereof, wherein: the non-aqueous carrier including: one or more fatty acids, one or more glycerides, one or more essential oils, one or more hydrocarbons, one or more petroleum oils, or mixtures thereof, the one or more phospholipids are selected from the group consisting of: (1) diacylglyceridephospholipids or glycerophospholipids selected from the group consisting of phosphatidic acid (phosphatidate) (PA), phosphatidylethanolamine (cephalin) (PE), phosphatidylcholine (lecithin) (PC), phosphatidylserine (PS), and mixture thereof; (2) phosphoinositides selected from the group consisting of phosphatidylinositol (PI), phosphatidylinositol phosphate (PIP), phosphatidylinositol bisphosphate (PIP2) and phosphatidylinositol triphosphate (PIP3), and mixture thereof; (3) phosphosphingolipids selected from the group consisting of ceramide phosphorylcholine (Sphingomyelin) (SPH), ceramide phosphorylethanolamine (Sphingomyelin) (Cer-PE), ceramide phosphorylglycerol, and mixture thereof; and (4) mixtures thereof; or the one or more amphoteric acetates are selected from the group consisting of lauroarnphoacetate, alkyl amphoacetate, cocoampho(di)acetate, cocoarnphoacetate, cocoamphodiacetate, disodium cocoamphodiacetate, sodium cocoamphoacetate, sodium lauroamphoacetate, disodium cocoamphodiacetate, disodium capryloamphodiacetate, disodium lauroamphoacetate, disodium wheatgermamphodiacetate, cocoarnphoacetate, cocoamphoace tate, cocoamphoacetate, cocoamphoacetate and cocoamphodiacetate, disodium cocoamphodiacetate, or mixtures thereof; or the one or more amphoteric betaines are selected from the group consisting of cocamidopropyl betaine, sodium lauroamphoace, cocoamidopropyl hydroxy sulfo baden (CHSB), dodecyl dimethyl betaine, cetyl betaine, lauroarnphoacetate, alkyl amphoacetate, cocoampho(di)acetate, cocoarnphoacetate, cocoamphodiacetate, disodium cocoamphodiacetate, sodium cocoamphoacetate, sodium lauroamphoacetate, disodium cocoamphodiacetate, disodium capryloamphodiacetate, disodium lauroamphoacetate, disodium wheatgermamphodiacetate, cocoarnphoacetate, alkylamido baden, alkyldimethyl betaine, cocoamidopropylbetaine, tallowbis (hydroxyethyl)baden, hexadecyldimethylbetaine, alkyl amido propyl sulfo baden, alkyl dimethyl amine baden, coco amido propyl dimethyl baden, alkyl amido propyl dimethyl amine baden, cocamidopropyl baden, lauryl betaine, laurylamidopropyl betaine, coco amido baden, lauryl amido baden, dimethiconepropylPG-betaine, N-alkyldimethylbetaine, coco biguamide derivative, cetyl baden, oleamidopropyl betaine, isostearamidopropyl betaine, oleyl betaine, wheatgermamidopropylbetaine, cocamidopropyl betaine, lauramidopropylbetaine, 2-alkyl-N-carboxymethyl-N-hydroxyethyl imidazolinium baden, cocamidopropyl betaine, isostearamidopropylbetaine, myristamidopropylbetaine, palmitamidopropyl betaine, cocamidopropyl hydroxy sultaine, ammonium chloride cocamidopropyl hydroxy sultaine and potassium chloride, cocamidopropyl hydroxy sultaine, undecylenamidopropylbaden, wheatgermamidopropylbetaine, or mixture thereof; or the one or more amphoteric glycinates are selected from the group consisting of cocoamphocarboxyglycinate, tallowamphocarboxyglycinate, oleoamphocarboxyglycinate, cocoiminodiglycinate, capryloamphocarboxyglycinate, bis-2-hydroxyethyl tallow glycinate, lauryl amphoglycinate, oleic polyamphoglycinate, C10/12-fatty acid amidoethyl-N-(2-hydroxyethyl)-glycinate, C12/18-fatty acid amidoethyl-N-(2-hydroxyethyl)-glycinate, dihydroxyethyl tallow glycinate, or mixtures thereof; or the one or more amphoteric imidazolines are selected from the group consisting of 2-alkyl-I-(ethyl-beta-oxipropanoianoic)imidazoline sodium salt based on caprylic acid, 1-hydrox yethyl-2-alkylimidazoline, coco imidazoline, tall oil imidazoline, lauryl imidazoline, coco imidazoline dicarboxymethylated, sodium copra dicarboxylic imidazoline, oleyl imidazoline or mixtures thereof; or the one or more amphoteric propionates are selected from the group consisting of cocoiminodipropionate, octyliminodipropionate, cocoalkylaminopropionic acid, cocoamphodipropionate, lauraminopropionic acid, disodium tallow-p-iminodipropionate, monosodium-N-lauryl p-iminodipropionic acid, disodium lauriminodipropionate, sodium lauriminopropionic acid, 2-ethylhexylamino dipropionate, coco amino dipropionate, cocaminopropionicacid, lauraminopropionic acid, sodium lauriminodipropionate, disodium cocoamphodipropionate, disodium capryloamphodipropionate, disodium lauroamphodipropionate, sodium cocoamphopropionate, sodiumlauriminodipropionate, sodiumalkyliminopropionate or mixtures thereof; or the one or more other amphoteric agents are selected from the group consisting of N-coco-3-aminobutyric acid, sodium salt, N-coco-3-aminobutyric acid, ethoxylated fatty alcohol carboxym, cocamidopropyl hydroxy sultaine, sodium cocoamphohydroxypropyl sulfonate, sodium capryloarnphohydroxypropylsulfonate and mixtures or combinations thereof, and wherein the composition is adapted to temporarily enhance a luster and/or brilliance of the piece of jewelry, the gem stone, or the piece of jewelry including a gem stone.

10. The method of claim 9, wherein, in the applying step, the composition further comprising:
one or more fragrances.

11. The method of claim 10, wherein, in the applying step, the composition further comprises:
between about 99.99% and about 95% of the non-aqueous carrier, and
between about 0.01% and about 5% of one or more fragrances.

12. The method of claim 10, wherein, in the applying step:
the one or more fragrances are selected from the group consisting of absinthe, acai berry, agave, allspice, almond, aloe, amaretto, amber, ambergris, ambrosia, anise, apple blossom, apple, appletini, apricot, asian pear, asian plum, avocado, azalea, bacon, balsam pine, balsam fir, bamboo, banana, basil, bay leaf, bayberry, beragamot, birds of paradise, black licorice, black tea, black currant, black cherry, black raspberry, black fig, blackberry, blueberry, boysenberry, brown sugar, bubble gum, butter rum, butter pecan, butterscotch, cafe mocha, calla lily, camphor, candy cane, candy corn, cannabis flower, cantaloupe, cappuccino, caramel, cardamon cedar blossom, carnation, casablanca lily, cassia, cassis, cedar, chai tea, chamomile, champagne, chardonnay, cherry blossom, cherry, chestnuts, chili pepper, chocolate, chrysanthemum, churo, chypre, cilantro, cinnamon, citron, citronella, elementine, clove, clover, cocoa butter, coconut, coffee, cognac, cola, concord grape, corn, cotton candy, crab apple, cranberry, creme brulee, cucumber, cyclamen, cyprus, daffodil, dahlia, daisy, dandelion, delphinium, dewberry, dirt, dogwood, douglas fir, driftwood, egg nog, elderberry, english lavender, english ivy, eucalyptus, evergreen, expresso, fern, fig, forsythia, frangipan, frankincense, freesia, fresh cut grass, gardenia, geranium, ginger, ginger blossom, ginger snap, gingerbread, gladiola, gooseberry, grape, grapefruit, green tea, guarana, guava, hazelnut, heliotrope, hemlock, hibiscus, hollyberry, honey, honeysuckle, huckleberry, hyacinth, hydrangea, impatiens, iris, irish cream, jasmine, juniper, kailua, key lime, kiwi, kumquat, lavanda, lavender, leather, lemon grass, lemon, lemon peel, lemon lime, licorice, lilac, lily of the valley, lily, lime, loganberry, lotus blossom, lotus, macadamia nut, macaron, magnolia, mandarin, mango, maple, maple syrup, margarita, marichino cherry, maricopa, marigold, marmalade, marshmallow, mayan gold, melon, menthol, merlot wine, milk, mimosa, mint, mistletoe, mojito, morning glory, moss, mulberry, mulled cider, muscadine, musk, myrrh, nag champp, narcissus, nectarine, neroli, neutroleum alpha, nutmeg, oak, oakmoss, oatmeal, olive blossom, olive, orange, orange blossom, orange peel, orchid, orchid blossom, orris root, pansy, papaya, passion fruit, passion flower, patchouli, peach, peach blossom, peach cobbler, peanut butter, pear, pecan, peony, peppercorn, peppermint, peppermint stick, periwinkle, persimmon, pikake flowers, pina colada, pine, pineapple, pinion, pink lemonade, pink grapefruit, pistachio, pizza, plum, plumeria, poinsettia, pomegranate, popcorn, poppy, poppyseed, potpourri, pralines, primrose, pumpkin, rain, raisin, raspberry, red cherry, red currant, red raspberry, redwood embers, rhubarb, roasted chestnut, root beer, rose, rosemary, rosewood, ruby red grapefruit, rum, sage, sandalwood, sassafras, satsuma, shea, shiraz, shortbread, smoke, snapdragon, snicker doodle, spearmint, spruce, strawberry, suntan oil, sweet grass, sweet pea, syringa, taffy, tangerine, teaberry, teakwood, thyme, thyme, tiger lily, tobacco, toffee, tomato, tonka bean, truffle, tuberose, tulip, tutti frutti, vanilla, verbena, vetiver, violet, vitiver wood, wassail, water lily, watermelon, white chocolate, wild grass, wintergreen, wintermint, wisteria, woodberry, woodland, ylang ylang, yuzu, zinfindel, zinnia, and mixtures thereof.

13. The method of claim 9, wherein, in the applying step:
the one or more fatty acids are selected from the group consisting of saturated fatty acid, unsaturated fatty acids, or mixtures thereof;
the one or more glycerides are selected from the group consisting of mono-glycerides comprising mono-glycerol esters, di-glyceride comprising di-glycerol esters, triglycerides comprising tri-glycerol esters;
the one or more hydrocarbons are selected from the group consisting of alkanes having between six and 30 carbon atoms, alkenes between six and 30 carbon atoms, alkylated aromatic hydrocarbons having between 10 and 30 carbon atoms, and mixtures thereof, wherein one or more of the carbon atoms may be replaced by an nitrogen, an oxygen, a sulfur atom, and mixtures thereof;
the one or more petroleum oils are selected from the group consisting of distilled petroleum, polyalphaolefins, mineral spirits, and mixtures thereof.

14. The method of claim 13, wherein, in the applying step:
the one or more glycerides are selected from the group consisting of animal oils, plant oils, and mixtures thereof.

15. The method of claim 14, wherein, in the applying step:
the plant oils are selected from the group consisting of amaranth oil, almond oil, apricot oil, argan oil, artichoke oil, avocado oil, babassu oil, ben oil, borneo tallow nut oil, buffalo gourd oil, canola oil, carob pod oil, algaroba oil, cashew oil, coconut oil, coriander seed oil, corn oil, false flax oil, grape seed oil, hazlenut oil, hemp oil, hibiscus seed oil, kapok seed oil, lallemantia oil, macadamia oil, meadowfoam seed oil, mustard oil, okra seed oil, olive oil, palm oil, peanut oil, pecan oil, perilla seed oil, pequi oil, pine nut oil, pistachio oil, poppyseed oil, prune kernel oil, pumpkin seed oil, quinoa oil, ramtil oil, rapeseed oil, rice bran oil, safflower oil, sesame oil, soybean oil, sunflower oil, tea oil, camellia oil, thistle oil, walnut oil, wheat germ oil, and mixtures thereof.

16. The method of claim 9, wherein, in the applying step:
the piece of jewelry comprises a ring, a brooch, a pendant, a necklace, a bracelet, an ear ring, or a watch;
the gem stone is selected from geh group consisting of actinolite, nephrite, adamite, aegerine, afghanite, agate, irisagate, onyx, sardonyx, agrellite, albite, alunite, amblygonite, analcime, anatase, andalusite, chiastolite, andesine, anglesite, anhydrite, annabergite, antigorite, bowenite, apatite, apophyllite, aragonite, arfvedsonite, astrophyllite, atacamite, austinite, ferroaxinite, magnesioaxinite, manganaxinite, tinzenite, azurite, baryte, bastnaesite, bayldonite, benitoite, aquamarine, bixbite, emerald, goshenite, goldenberyl, heliodor, morganite, beryllonite, beudantite, biotite, boleite, boracite, bornite, brazilianite, bronzite, brookite, brucite, bustamite, bytownite, calcite, manganocalcite, caledonite, cancrinite, vishnevite, carletonite, carnallite, carnelian, cassiterite, cavansite, celestite (celestine), cerussite, chabazite, chalcopyrite, chambersite, charlesite, charoite, childrenite, chloromelanite, chondrodite, chrysoberyl, alexandrite, cymophane, chromite, chrysocolla, chrysoprase, chrysotile, cinnabar, citrine, clinochlore, clinohumite, clinozoisite, clintonite, cordierite, iolite, corundum, ruby, sapphire, covellite, creedite, cryolite, cuprite, danburite, datolite, diamond, bort, diaspore, diopside, dioptase, dolomite, dravite, dumortierite, elbaite, emerald, trapicheemerald, enstatite, bronzite, hypersthene, eosphorite, epidote, piemontite, erythrite, esperite, ettringite, euclase, eudialyte, fayalite, ferroaxinite, andesine, albite, anorthite, anorthoclase, amazonite, bytownite, celsian, labradorite, microcline, moonstone, orthoclase, sanidine, sunstone, fluorapatite, fluorapophyllite, fluorite, forsterite, gahnite, pyralspite, almandine, pyrope, spessartine, ugrandite, andradite, demantoid, melanite, topazolite, grossular, hessonite, hydrogrossular, tsavorite, uvarovite, almandine-pyrope, rhodolite, andradite-grossular, grandite, pyrope-almandine-spessartine, malaiagarnet, pyrope-spessartine, umbalite, gaspeite, gaylussite, gibbsite, glaucophane, goethite, goosecreekite, grandidierite, gypsum, gyrolite, hackmanite, halite, hambergite, hanksite, hardystonite, hauyne, hematite, hemimorphite, herderite, hexagonite, hibonite, hiddenite, hodgkinsonite, howlite, humite, hypersthene, iolite, jade, jadeite, nephrite, jasper, radiolarite, jeremejevite, kainite, kornerupine, kunzite, kutnohorite, kurnakovite, kyanite, langbeinite, lapislazuli, larimar, lawsonite, lazurite, legrandite, lepidolite, leucite, leucophanite, linarite, lizardite, londonite, ludlamite, magnesite, malachite, marialite-meionite, wernerite, mimetite, moissanite, moonstone, adularia, rainbow, mottramite, muscovite, fuchsite, musgravite, narsarsukite, natrolite, nepheline, neptunite, nickeline, nuummite, opal, painite, papagoite, pargasite, pectolite, larimar, peridot, periclase, petalite (castorite), pezzottaite, phenakite, phlogopite, phosgenite, phosphophyllite, piemontite, pietersite, plumbogummite, pollucite, polyhalite, poudretteite, prasiolite, prehnite, prismatine, proustite, pumpellyite, chlorastrolite, purpurite, pyrite, pyrargyrite, pyromorphite, pyrrhotite, quartz, amethyst, ametrine, chalcedony, agate, irisagate, onyx, sardonyx, bloodstone (heliotrope), carnelian, chromechalcedony, chrysoprase, dendriticagate, mossagate, fireagate (iridescentvar), jasper, petrifiedwood, sard, citrine, druzy, flint, milkyquartz, prasiolite, rosequartz, rockcrystal, smokyquartz, ruby, richterite, rosequartz, rhodizite, rhodochrosite, riebeckite, crocidolite, rosasite, rutile, sapphire, padparadscha, sard, sardonyx, scapolite, scheelite, schorl, scolecite, scorodite, selenite, sellaite, senarmontite, sérandite, seraphinite, serendibite, antigorite, bowenite, chrysotile, lizardite, stichtite, shattuckite, shigaite, shortite, shungite, siderite, sillimanite, sinhalite, smithsonite, sodalite, hackmanite, sperrylite, spessartite, spinel, ceylonite, spodumene, hiddenite, kunzite, triphane, stichtite, staurolite, sulfur, stolzite, sugilite, bustamite, richterite, sylvite, taaffeite, tantalite, thomsonite, thaumasite, tinaksite, titanite (sphene), topaz, achroite, canary, fluor-liddicoatite, indicolite, olenite, paraiba, rossmanite, rubellite, tremolite, hexagonite, tugtupite, turquoise, vanadinite, variscite, väyrynenite, vesuvianite (idocrase), californite, villiaumite, vlasovite, wavellite, weloganite, willemite, wulfenite, xonotlite, zektzerite, zeolites, analcite, apophyllite, chabazite, goosecreekite, natrolite, stellarite, thomsonite, zincite, zinnwaldite, zircon, jacinth, zoisite, tanzanite, thulite, zulta, or mixtures thereof.

17. A method comprising: applying, onto a piece of jewelry, a gem stone, or a piece of jewelry including a gem stone, a non-aqueous composition comprising: between about 99.98% and about 90% of a non-aqueous carrier, between about 0.01% and about 5% of one or more fragrances, and between about 0.010% and about 5% of one or more amphoteric betaines; wherein: the non-aqueous carrier including: one or more fatty acids, one or more glycerides, one or more essential oils, one or more hydrocarbons, one or more petroleum oils, or mixtures thereof; the one or more amphoteric betaines are selected from the group consisting of cocamidopropyl betaine, sodium lauroamphoace, cocoamidopropyl hydroxy sulfo baden (CHSB), dodecyl dimethyl betaine, cetyl betaine, lauroarnphoacetate, alkyl amphoacetate, cocoampho(di)acetate, cocoarnphoacetate, cocoamphodiacetate, disodium cocoamphodiacetate, sodium cocoamphoacetate, sodium lauroamphoacetate, disodium cocoamphodiacetate, disodium capryloamphodiacetate, disodium lauroamphoacetate, disodium wheatgermamphodiacetate, cocoarnphoacetate, alkylamido baden, alkyldimethyl betaine, cocoamidopropylbetaine, tallow bis (hydroxyethyl)baden, hexadecyldimethylbetaine, alkyl amido propyl sulfo baden, alkyl dimethyl amine baden, coco amido propyl dimethyl baden, alkyl amido propyl dimethyl amine baden, cocamidopropyl baden, lauryl betaine, laurylamidopropyl betaine, coco amido baden, lauryl amido baden, dimethicone propyl PG-betaine, N-alkyldimethyl betaine, coco biguamide derivative, cetyl baden, oleamidopropyl betaine, isostearamidopropyl betaine, oleyl betaine, wheatgermamidopropyl betaine, cocamidopropyl betaine, lauramidopropyl betaine, 2-alkyl-N-carboxymethyl-N-hydroxyethyl imidazolinium baden, cocamidopropyl betaine, isostearamidopropyl betaine, myristamidopropylbetaine, palmitamidopropyl betaine, cocamidopropyl hydroxy sultaine, ammonium chloride cocamidopropyl hydroxy sultaine and potassium chloride, cocamidopropyl hydroxy sultaine, undecylenamidopropyl baden, wheatgermamidopropyl betaine, or mixture thereof; and wherein the composition is adapted to temporarily enhance a luster and/or brilliance of the piece of jewelry, the gem stone, or the piece of jewelry including a gem stone.

18. The method of claim 17, wherein, in the applying step:
the one or more fatty acids are selected from the group consisting of saturated fatty acid, unsaturated fatty acids, or mixtures thereof;
the one or more glycerides are selected from the group consisting of mono-glycerides comprising mono-glycerol esters, di-glyceride comprising di-glycerol esters, triglycerides comprising tri-glycerol esters;
the one or more hydrocarbons are selected from the group consisting of alkanes having between six and 30 carbon atoms, alkenes between six and 30 carbon atoms, alkylated aromatic hydrocarbons having between 10 and 30 carbon atoms, and mixtures thereof, wherein one or more of the carbon atoms may be replaced by an nitrogen, an oxygen, a sulfur atom, and mixtures thereof; and
the one or more petroleum oils are selected from the group consisting of distilled petroleum, polyalphaolefins, mineral spirits, and mixtures thereof.

19. The method of claim 17, wherein, in the applying step:
the one or more fragrances are selected from the group consisting of absinthe, acai berry, agave, allspice, almond, aloe, amaretto, amber, ambergris, ambrosia, anise, apple blossom, apple, appletini, apricot, asian pear, asian plum, avocado, azalea, bacon, balsam pine, balsam fir, bamboo, banana, basil, bay leaf, bayberry, beragamot, birds of paradise, black licorice, black tea, black currant, black cherry, black raspberry, black fig, blackberry, blueberry, boysenberry, brown sugar, bubble gum, butter rum, butter pecan, butterscotch, cafe mocha, calla lily, camphor, candy cane, candy corn, cannabis flower, cantaloupe, cappuccino, caramel, cardamon cedar blossom, carnation, casablanca lily, cassia, cassis, cedar, chai tea, chamomile, champagne, chardonnay, cherry blossom, cherry, chestnuts, chili pepper, chocolate, chrysanthemum, churo, chypre, cilantro, cinnamon, citron, citronella, elementine, clove, clover, cocoa butter, coconut, coffee, cognac, cola, concord grape, corn, cotton candy, crab apple, cranberry, creme brulee, cucumber, cyclamen, cyprus, daffodil, dahlia, daisy, dandelion, delphinium, dewberry, dirt, dogwood, douglas fir, driftwood, egg nog, elderberry, english lavender, english ivy, eucalyptus, evergreen, expresso, fern, fig, forsythia, frangipan, frankincense, freesia, fresh cut grass, gardenia, geranium, ginger, ginger blossom, ginger snap, gingerbread, gladiola, gooseberry, grape, grapefruit, green tea, guarana, guava, hazelnut, heliotrope, hemlock, hibiscus, hollyberry, honey, honeysuckle, huckleberry, hyacinth, hydrangea, impatiens, iris, irish cream, jasmine, juniper, kailua, key lime, kiwi, kumquat, lavanda, lavender, leather, lemon grass, lemon, lemon peel, lemon lime, licorice, lilac, lily of the valley, lily, lime, loganberry, lotus blossom, lotus, macadamia nut, macaron, magnolia, mandarin, mango, maple, maple syrup, margarita, marichino cherry, maricopa, marigold, marmalade, marshmallow, mayan gold, melon, menthol, merlot wine, milk, mimosa, mint, mistletoe, mojito, morning glory, moss, mulberry, mulled cider, muscadine, musk, myrrh, nag champp, narcissus, nectarine, neroli, neutroleum alpha, nutmeg, oak, oakmoss, oatmeal, olive blossom, olive, orange, orange blossom, orange peel, orchid, orchid blossom, orris root, pansy, papaya, passion fruit, passion flower, patchouli, peach, peach blossom, peach cobbler, peanut butter, pear, pecan, peony, peppercorn, peppermint, peppermint stick, periwinkle, persimmon, pikake flowers, pina colada, pine, pineapple, pinion, pink lemonade, pink grapefruit, pistachio, pizza, plum, plumeria, poinsettia, pomegranate, popcorn, poppy, poppyseed, potpourri, pralines, primrose, pumpkin, rain, raisin, raspberry, red cherry, red currant, red raspberry, redwood embers, rhubarb, roasted chestnut, root beer, rose, rosemary, rosewood, ruby red grapefruit, rum, sage, sandalwood, sassafras, satsuma, shea, shiraz, shortbread, smoke, snapdragon, snicker doodle, spearmint, spruce, strawberry, suntan oil, sweet grass, sweet pea, syringa, taffy, tangerine, teaberry, teakwood, thyme, thyme, tiger lily, tobacco, toffee, tomato, tonka bean, truffle, tuberose, tulip, tutti fruitti, vanilla, verbena, vetiver, violet, vitiver wood, wassail, water lily, watermelon, white chocolate, wild grass, wintergreen, wintermint, wisteria, woodberry, woodland, ylang ylang, yuzu, zinfindel, zinnia, and mixtures thereof.

20. The method of claim 17, wherein, in the applying step:
the piece of jewelry comprises a ring, a brooch, a pendant, a necklace, a bracelet, an ear ring, or a watch; and
the gem stone is selected from the group consisting of actinolite, nephrite, adamite, aegerine, afghanite, agate, irisagate, onyx, sardonyx, agrellite, albite, alunite, amblygonite, analcime, anatase, andalusite, chiastolite, andesine, anglesite, anhydrite, annabergite, antigorite, bowenite, apatite, apophyllite, aragonite, arfvedsonite, astrophyllite, atacamite, austinite, ferroaxinite, magnesioaxinite, manganaxinite, tinzenite, azurite, baryte, bastnaesite, bayldonite, benitoite, aquamarine, bixbite, emerald, goshenite, goldenberyl, heliodor, morganite, beryllonite, beudantite, biotite, boleite, boracite, bornite, brazilianite, bronzite, brookite, brucite, bustamite, bytownite, calcite, manganocalcite, caledonite, cancrinite, vishnevite, carletonite, carnallite, carnelian, cassiterite, cavansite, celestite (celestine), cerussite, chabazite, chalcopyrite, chambersite, charlesite, charoite, childrenite, chloromelanite, chondrodite, chrysoberyl, alexandrite, cymophane, chromite, chrysocolla, chrysoprase, chrysotile, cinnabar, citrine, clinochlore, clinohumite, clinozoisite, clintonite, cordierite, iolite, corundum, ruby, sapphire, covellite, creedite, cryolite, cuprite, danburite, datolite, diamond, bort, diaspore, diopside, dioptase, dolomite, dravite, dumortierite, elbaite, emerald, trapicheemerald, enstatite, bronzite, hypersthene, eosphorite, epidote, piemontite, erythrite, esperite, ettringite, euclase, eudialyte, fayalite, ferroaxinite, andesine, albite, anorthite, anorthoclase, amazonite, bytownite, celsian, labradorite, microcline, moonstone, orthoclase, sanidine, sunstone, fluorapatite, fluorapophyllite, fluorite, forsterite, gahnite, pyralspite, almandine, pyrope, spessartine, ugrandite, andradite, demantoid, melanite, topazolite, grossular, hessonite, hydrogrossular, tsavorite, uvarovite, almandine-pyrope, rhodolite, andradite-grossular, grandite, pyrope-almandine-spessartine, malaiagarnet, pyrope-spessartine, umbalite, gaspeite, gaylussite, gibbsite, glaucophane, goethite, goosecreekite, grandidierite, gypsum, gyrolite, hackmanite, halite, hambergite, hanksite, hardystonite, hauyne, hematite, hemimorphite, herderite, hexagonite, hibonite, hiddenite, hodgkinsonite, howlite, humite, hypersthene, iolite, jade, jadeite, nephrite, jasper, radiolarite, jeremejevite, kainite, kornerupine, kunzite, kutnohorite, kurnakovite, kyanite, langbeinite, lapislazuli, larimar, lawsonite, lazurite, legrandite, lepidolite, leucite, leucophanite, linarite, lizardite, londonite, ludlamite, magnesite, malachite, marialite-meionite, wernerite, mimetite, moissanite, moonstone, adularia, rainbow, mottramite, muscovite, fuchsite, musgravite, narsarsukite, natrolite, nepheline, neptunite, nickeline, nuummite, opal, painite, papagoite, pargasite, pectolite, larimar, peridot, periclase, petalite (castorite), pezzottaite, phenakite, phlogopite, phosgenite, phosphophyllite, piemontite, pietersite, plumbogummite, pollucite, polyhalite, poudretteite, prasiolite, prehnite, prismatine, proustite, pumpellyite, chlorastrolite, purpurite, pyrite, pyrargyrite, pyromorphite, pyrrhotite, quartz, amethyst, ametrine, chalcedony, agate, irisagate, onyx, sardonyx, bloodstone (heliotrope), carnelian, chromechalcedony, chrysoprase, dendriticagate, mossagate, fireagate (iridescentvar), jasper, petrifiedwood, sard, citrine, druzy, flint, milkyquartz, prasiolite, rosequartz, rockcrystal, smokyquartz, ruby, richterite, rosequartz, rhodizite, rhodochrosite, riebeckite, crocidolite, rosasite, rutile, sapphire, padparadscha, sard, sardonyx, scapolite, scheelite, schorl, scolecite, scorodite, selenite, sellaite, senarmontite, sérandite, seraphinite, serendibite, antigorite, bowenite, chrysotile, lizardite, stichtite, shattuckite, shigaite, shortite, shungite, siderite, sillimanite, sinhalite, smithsonite, sodalite, hackmanite, sperrylite, spessartite, spinel, ceylonite, spodumene, hiddenite, kunzite, triphane, stichtite, staurolite, sulfur, stolzite, sugilite, bustamite, richterite, sylvite, taaffeite, tantalite, thomsonite, thaumasite, tinaksite, titanite (sphene), topaz, achroite, canary, fluor-liddicoatite, indicolite, olenite, paraiba, rossmanite, rubellite, tremolite, hexagonite, tugtupite, turquoise, vanadinite, variscite, väyrynenite, vesuvianite (idocrase), californite, villiaumite, vlasovite, wavellite, weloganite, willemite, wulfenite, xonotlite, zektzerite, zeolites, analcite, apophyllite, chabazite, goosecreekite, natrolite, stellarite, thomsonite, zincite, zinnwaldite, zircon, jacinth, zoisite, tanzanite, thulite, zulta, and mixtures thereof.

* * * * *

UNITED STATES PATENT AND TRADEMARK OFFICE
CERTIFICATE OF CORRECTION

PATENT NO. : 12,023,707 B2  
APPLICATION NO. : 18/134784  
DATED : July 2, 2024  
INVENTOR(S) : Paul Ashley Page 1 of 1

It is certified that error appears in the above-identified patent and that said Letters Patent is hereby corrected as shown below:

On the Title Page

(12) reads:
"Ashley et al."
Should read:
--Ashley--

(71) Applicants read:
"Paul Ashley, Brazoria, TX (US);
Brooke Ashley, Brazoria, TX (US)"
Should read:
--Paul Ashley, Brazoria, TX (US)--

(72) Inventors reads:
"Paul Ashley, Brazoria, TX (US);
Brooke Ashley, Brazoria, TX (US)"
Should read:
--Paul Ashley, Brazoria, TX (US)--

Signed and Sealed this  
Twenty-ninth Day of April, 2025

Coke Morgan Stewart  
*Acting Director of the United States Patent and Trademark Office*